(12) United States Patent
Kawakubo et al.

(10) Patent No.: US 7,198,021 B2
(45) Date of Patent: Apr. 3, 2007

(54) POWERTRAIN ASSEMBLY INCLUDING MODULAR TRANSMISSION

(75) Inventors: Hiroyuki Kawakubo, Saitama (JP); Toru Gunji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 10/925,223

(22) Filed: Aug. 24, 2004

(65) Prior Publication Data

US 2005/0085329 A1   Apr. 21, 2005

(30) Foreign Application Priority Data

Sep. 9, 2003   (JP) ............... 2003-316712

(51) Int. Cl.
*F01M 1/02*   (2006.01)
(52) U.S. Cl. .................................. 123/198 P
(58) Field of Classification Search ............ 123/198 R, 123/198 P
See application file for complete search history.

(56) References Cited

U.S. PATENT DOCUMENTS 5,216,989 A * 6/1993 Iwata et al. .............. 123/90.31
6,631,703 B2 * 10/2003 Tonnqvist et al. ......... 123/198 R
7,055,487 B2 * 6/2006 Kawakubo et al. ....... 123/196 A
2005/0087032 A1 * 4/2005 Kawakubo et al. ........ 74/473.1

FOREIGN PATENT DOCUMENTS

| JP | 62-34950 | 7/1987 |
| JP | B 7-99086 | 10/1995 |
| JP | 3040361 | * 5/2004 |

* cited by examiner

*Primary Examiner*—Stephen K. Cronin
*Assistant Examiner*—Jason Benton
(74) *Attorney, Agent, or Firm*—Carrier, Blackman & Associates, P.C.; William D. Blackman; Joseph P. Carrier

(57) ABSTRACT

A powertrain assembly having an improved engine configuration includes an engine and a transmission incorporated in a crankcase of the engine. The engine also comprises an oil pump and a water pump. The transmission is a cartridge-type shift drum transmission, which can be attached to or detached from a transmission attachment face which is a side face of the crankcase. The oil pump and the transmission attachment face are arranged in substantially non-overlapping relation in the side view of the engine. The water pump shaft is substantially coaxial with the oil pump shaft, and the water pump is positioned below a drive sprocket on the transmission countershaft so as to be overlapping while eliminating interference between them, allowing a close arrangement of components.

19 Claims, 14 Drawing Sheets

POWERTRAIN ASSEMBLY INCLUDING MODULAR TRANSMISSION

CROSS-REFERENCE TO RELATED APPLICATIONS

The present invention claims priority under 35 USC 119 based on Japanese patent application No. 2003-316712, filed Sep. 9, 2003.

BACKGROUND OF THE INVENTION

1. Field of the Invention

The present invention relates to vehicle powertrain assemblies, and particularly to powertrain assemblies in which a transmission is incorporated within an engine crankcase. More particularly, the present invention relates to a powertrain assembly in which engine components are arranged in an improved configuration, which permits the engine to be made with a more compact width, and in which a modular transmission is easy to remove from, and replace in the engine crankcase for improved serviceability.

2. Description of the Background Art

In general, in a vehicle engine, the rotary speed of a crankshaft is changed to a predetermined slower speed by a clutch mechanism and a transmission, before power from the engine is transmitted to a driving wheel.

There is a known engine type which incorporates a transmission inside of the engine crankcase (for example, refer to Japanese Published Patent Application 7-99086). In this type of engine, the primary driven gear of a clutch mechanism, and an engine oil pump are arranged substantially in side-by side relation so as to overlap with one another, as viewed from a side view of the engine (for example, refer to Japanese Published Patent JP-B 62-33050).

However, when the clutch mechanism and the transmission are arranged so as to be coaxial to each other when viewed from the side of the engine, if the primary driven gear of the clutch mechanism and the oil pump are arranged to overlap with each, when viewed from the side of the engine as described above, the width of the engine becomes large, and the number of possible mounting positions of the engine within the vehicle becomes small.

For an engine incorporating a transmission in a crankcase, a number of transmissions that are cartridge-type or modular are known and commercially available. A modular transmission is capable of being detached from the crankcase and removed from the engine as a unit, in order to improve serviceability of the transmission.

Although the cartridge-type or modular transmission has advantages, there is a need for an improved powertrain that uses incorporates a cartridge-type transmission in an engine crankcase, because the structure around the cartridge-type transmission affects its serviceability.

SUMMARY OF THE INVENTION

The present invention provides a powertrain including an engine and a modular transmission, in which the engine has an improved configuration so that the engine can be reduced in width, as compared to previously known engines of this type. The engine crankcase has a hollow chamber formed therein, which accommodates a cartridge-type transmission therein, so as to provide improved serviceability of the transmission.

The engine also includes an oil pump for circulating a lubricating oil, contained in an oil pan installed below the crankcase, to each part of the engine.

The transmission is provided for receiving rotary torque at a main transmission shaft from the engine's crankshaft spinning at a first speed, changing it to a different speed, and outputting the modified rotary torque via a transmission countershaft (output shaft).

In this engine, the transmission is made modular as a cartridge-type transmission which can be attached to and detached from a transmission attachment face, which is formed as a side face of the crankcase. The oil pump and the transmission attachment face are arranged in non-overlapping relation when viewed from the side of the engine. As a result of this non-overlapping relation, the transmission and the oil pump do not interfere with each other, when attaching or detaching the transmission from the crankcase.

When the cartridge-type transmission and the clutch mechanism are arranged so as to be coaxial to each other when viewed from the side of the engine, the oil pump does not overlap the clutch mechanism easily when viewed from the side of the engine, thereby making it possible to reduce the engine width.

A second aspect of the invention is an engine as described above, wherein the primary driven gear of a clutch mechanism is interposed between the crankshaft and the transmission and the oil pump, which are arranged not to overlap with each other when viewed from the side of the engine. Thereby, when the cartridge-type transmission is attached to, or detached from, the crankcase, the transmission and the primary driven gear do not interfere with each other.

Another aspect of the invention is an engine as described above, wherein the oil pump is driven by a chain, extending between it and the main transmission shaft. In this arrangement, the oil pump can be disconnected from the transmission by removing the chain, thereby making it easy to attach and detach the cartridge-type transmission, improving serviceability.

Yet another aspect of the invention is an engine as described above which comprises a water pump for supplying coolant to the engine cylinders. The water pump shaft of the water pump and the oil pump shaft of the oil pump are arranged so as to be coaxial with each other, as viewed from the side of the engine. The water pump is arranged to overlap with a chain line on the drive sprocket side of a drive chain, put on a drive sprocket fitted onto the countershaft when viewed from the side of the engine.

Thereby, the water pump can be positioned close to the drive sprocket, making it possible to obtain a compact engine. Particularly when the water pump is installed below the drive sprocket, the water pump and the oil pump do not need to be arranged at very high positions on the engine.

According to the invention described above, when the cartridge-type transmission is attached to or detached from the crankcase, the transmission and the oil pump do not interfere with each other. Therefore, the cartridge-type transmission can be easily attached or detached, thereby improving serviceability.

When the cartridge-type transmission and the clutch mechanism are arranged coaxially, as viewed from the side of the engine, the engine width can be reduced, thereby making it possible to ensure a large number of possible mounting positions of the engine within the vehicle.

According to the invention as described above, when the cartridge-type transmission is attached to, or detached from, the crankcase, the transmission and the primary driven gear do not interfere with each other. Therefore, the attachment and detachment of the transmission is made easier, and serviceability is further improved.

According to the invention as described above, since the oil pump can be disconnected from the transmission by removing the chain, attachment and detachment of the cartridge-type transmission become easier, and serviceability is improved.

According to the invention as described above, the engine can be made compact. Particularly when the water pump is installed below the drive sprocket, the water pump and the oil pump do not need to be installed at very high positions on the engine.

Modes for carrying out the present invention are explained below by reference to a number of selected illustrative embodiments of the present invention shown in the attached drawings. The above-mentioned object, other objects, characteristics and advantages of the present invention will become apparent form the detailed description of the embodiment of the invention presented below in conjunction with the attached drawings. Throughout the following description and in the drawings, like numbers refer to like parts.

DETAILED DESCRIPTION OF THE INVENTION

Hereinafter, with reference to the accompanying FIGS. 1–15, the description will be made of the best mode for carrying out the present invention. Specifically, the description will be made of a motorcycle equipped with an improved powertrain according to the present invention. In this respect, relative positional terms such as in front, behind, and left and right, as used in the description, are given from the vantage point of a driver, seated on the motorcycle and facing forward thereon.

Figure 1:
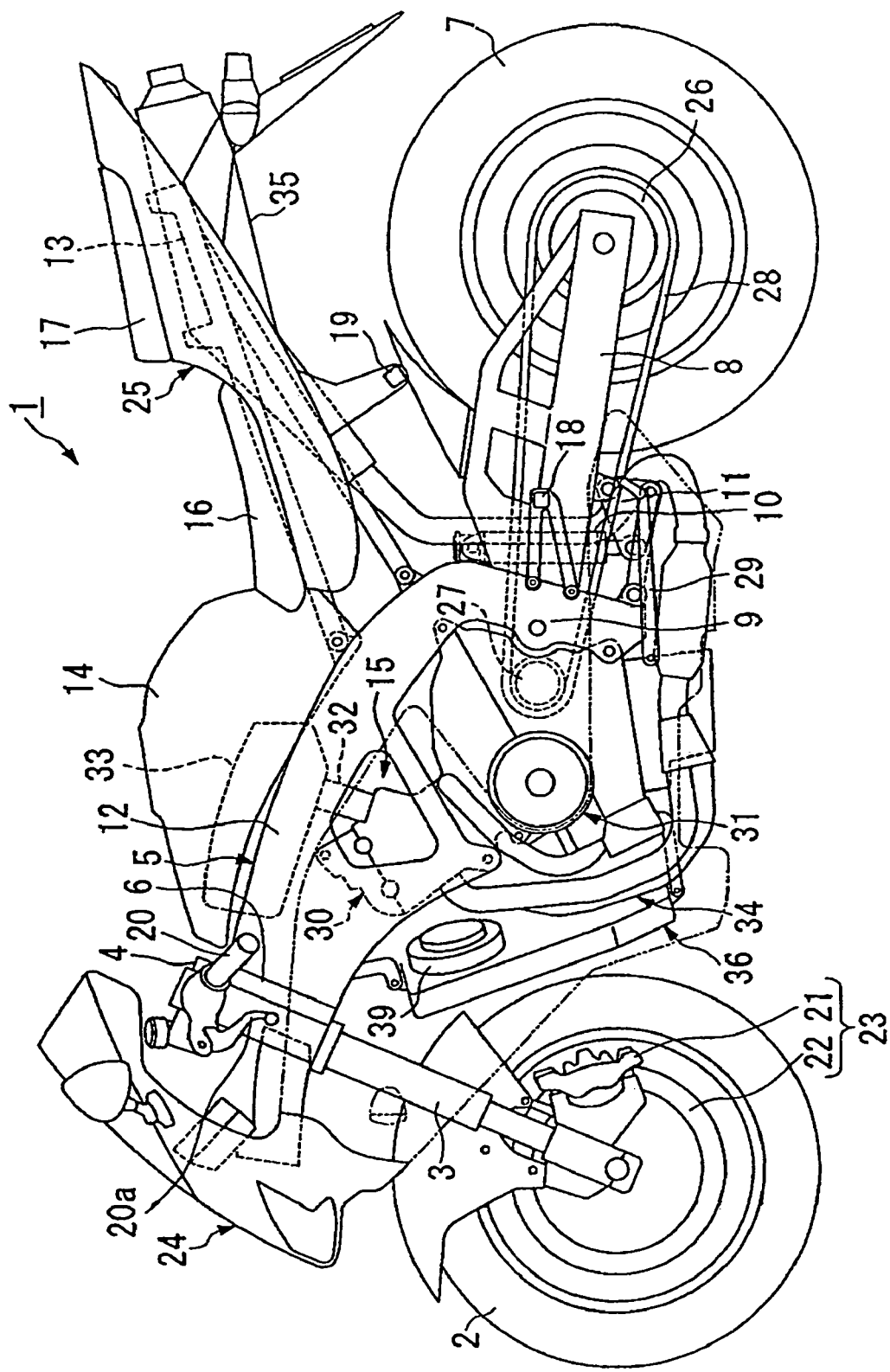
FIG. 1 is a side elevational view of a two-wheeled vehicle equipped with a powertrain according to a selected illustrative embodiment of the present invention.

As shown in FIG. 1, the front wheel 2 of a motorcycle 1 is journaled by a front fork 3, and the front fork 3 is pivotally connected to a head pipe 6, mounted to the front end of a body frame 5 by a top bridge 4, in a manner such that it can be steered. The rear wheel 7 of the motorcycle 1 is journaled by a rear fork 8, and the rear fork 8 is supported on a pivot post 9, mounted to the intermediate portion of the body frame 5 to and a powertrain assembly 15 in a manner such that it can move. The powertrain assembly 15 contains an engine 30 and a modular cartridge-type transmission 100, housed within the engine in a manner to be described further below.

The upper end of a shock absorber 10 is installed around the pivot axis of the rear fork 8. The lower end of the shock absorber 10 is connected to the lower portion of the powertrain assembly 15 by a link mechanism 11. The shock absorber 10 is provided to absorb an impact from an obstacle on the road while driving, so that the impact is not applied to the vehicle body through the rear wheel 7 and the rear fork 8.

The body frame 5 includes a main frame member 12, which branches into right and left sections, and extends downwardly and rearwardly from the upper portion of the head pipe 6. The rear end portions of the right and left sections bend down and are connected to the pivot post 9.

The body frame 5 also includes a sheet rail 13 connected to the rear end of the main frame member 12. A fuel tank 14 is installed above the main frame member 12, and the powertrain assembly 15 is installed below the main frame member 12.

A driver's seat 16 and a pillion seat 17 for a rear passenger are supported on the seat rail 13 behind the fuel tank 14. A step 18 for a driver is installed behind the pivot post 9 of the main frame member 12, and a step 19 for a rear passenger is installed below the seat rail 13. Further, a pair of right and left handlebars 20 are mounted to the upper end of the front fork 3.

A brake caliper 21 is mounted to the lower end of the front fork 3, and a brake rotor 22 for the brake caliper 21 is mounted to the front wheel 2 to constitute a front brake device 23. A rear brake device (not shown) is installed on the right side of the rear wheel 7, and the rear brake device has substantially the same construction as the front brake device 23 of the front wheel 2.

The front portion of the body frame 5 is covered with a front cowl 24, and the seat rail 13 and area therearound are covered with a rear cowl 25.

A rear sprocket 26 is installed on the left side of the rear wheel 7, and a drive chain 28 is put on the rear sprocket 26. A drive sprocket 27 is installed on the left rear side of the powertrain assembly 15, and is connected to the rear sprocket 26 via the drive chain 28, so that the drive force of the engine can be transmitted to the rear wheel 7.

A side kickstand 29, which can be pivotally stored when not in use, is arranged at the left lower portion of the body frame 5, so that it can support the motorcycle 1 while its body is inclined toward the left side.

The powertrain assembly 15 of this embodiment includes a water-cooled four-cylinder in-line engine 49, and also includes a shift drum transmission 100 which fits removably into a hollow chamber formed in the engine's crankcase 31, as will be described hereinafter. The engine 30 includes a cylinder body 49, which leans slightly forward above the crankcase 31.

Throttle bodies 32, corresponding to each of the respective cylinders, are connected to the rear portion of the cylinder body 49 and to an air cleaner case 33 interposed between the main frame member 12 and the fuel tank 14. Exhaust pipes 34, also corresponding to each of the respective cylinders, are connected to the front portion of the cylinder body 49. The exhaust pipes 34 curve downwardly from the front wall of the cylinder body 49, pass below the crankcase 31, bend upwardly after the pivot post 9, and are connected to a muffler 35 supported on the seat rail 13.

A radiator 36 is arranged in front of the exhaust pipes 34, in a manner such that it leans slightly forward, similar to the cylinder body 49. The radiator 36 has a round curved front portion and extends in the vertical direction from the upper portion of the cylinder body 49 to the lower portion of the crankcase 31. A pair of right and left radiator fans 39 are mounted on the upper flank portions of the radiator 36.

Internal Engine Structure

Figure 2:
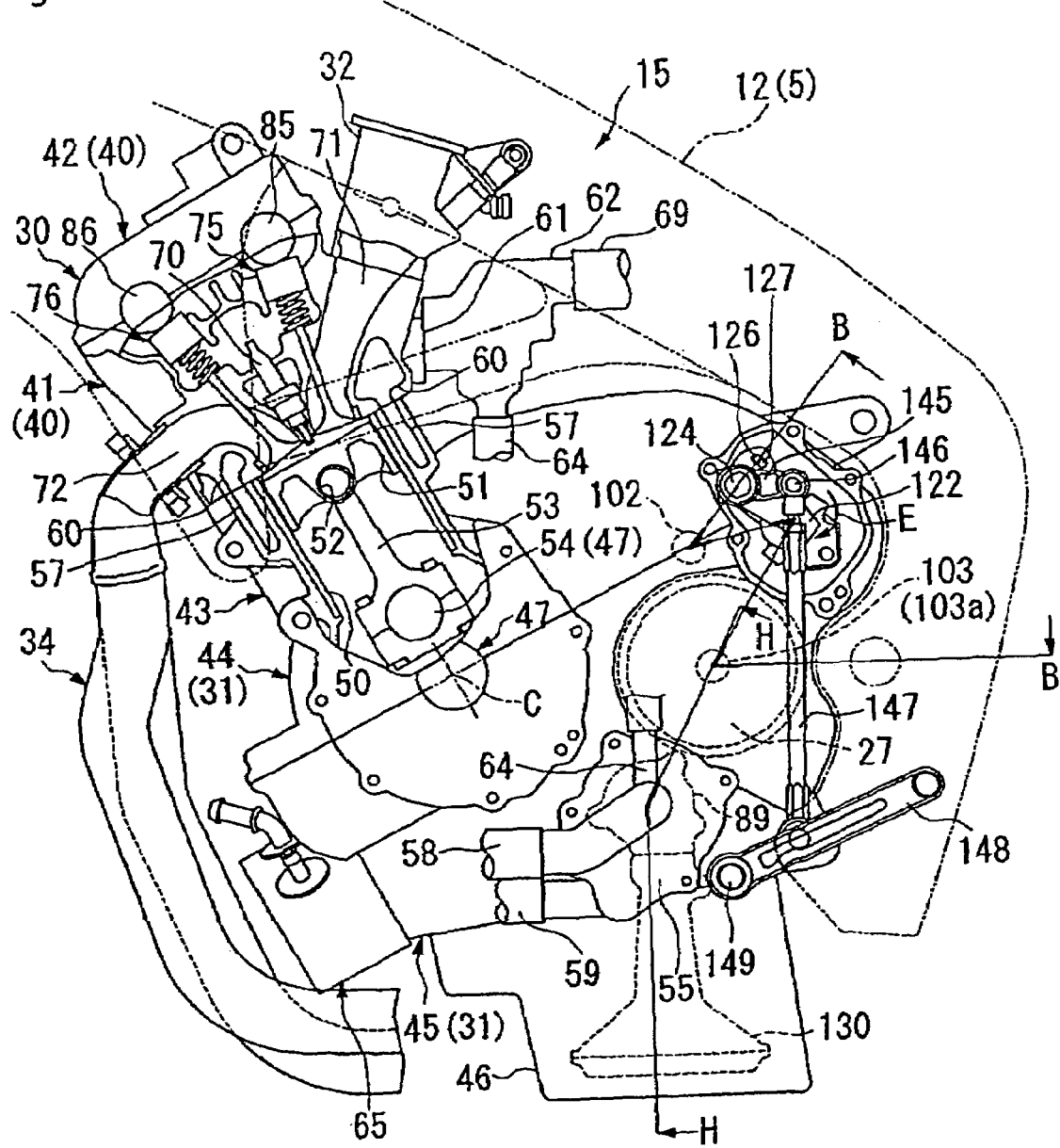
FIG. 2 is a left side view of a vehicle powertrain, according to a selected illustrative embodiment of the present invention.
Figure 3:
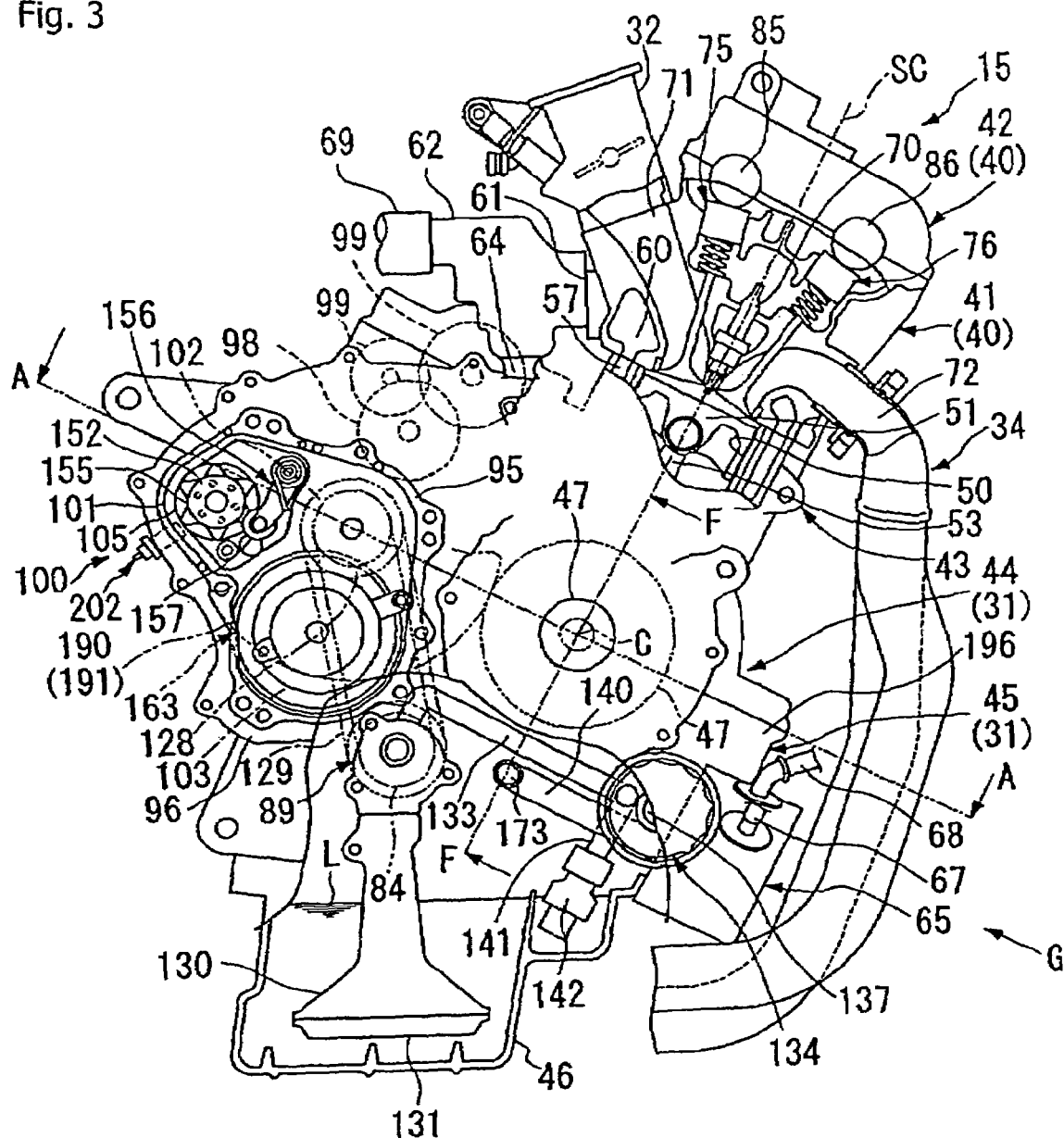
FIG. 3 is a right side view of the powertrain of FIG. 2.

As shown in the left side view of FIG. 2 and the right side view of FIG. 3, the engine 30 comprises a cylinder head 40, a cylinder block 43 and the crankcase 31 as its main parts. The cylinder head 40 includes a head body 41 and a head cover 42. The head body 41 is an aluminum alloy cast product.

Ignition plugs 70 are screwed into the head body 41 of the cylinder head 40 so that they penetrate combustion chambers, and inlet ports 71 and exhaust ports 72 communicating with the combustion chambers and the outside are formed. A throttle body 32 is connected to the opening on the outer side of each of the inlet ports 71, and an exhaust pipe 34 is connected to the opening on the outer side of each of the exhaust ports 72. A valve seat is mounted to the openings on the combustion chamber side of the inlet ports 71 and the exhaust ports 72, and these openings can be opened and closed by the operations of inlet valves 75 and exhaust valves 76.

Above the inlet valves 75 and the exhaust valves 76, an inlet-side cam shaft 85 and an exhaust-side cam shaft 86 for activating the inlet valves 75 and the exhaust valves 76 are arranged in parallel to the central axis C of the crankshaft 47, respectively. Inlet-side cams and exhaust-side cams (not shown) corresponding to the inlet valves 75 and the exhaust valves 76 are mounted on the outer walls of the inlet-side cam shaft 85 and the exhaust-side cam shaft 86, respectively.

A cam sprocket (not shown) is mounted to the right ends of the cam shafts 85 and 86, and the cam shafts 85 and 86 are coupled with the crankshaft 47 by a cam chain put round the cam sprockets. Since the camshafts 85 and 86 are turned by the revolution of the crankshaft 47, the inlet valves 75 and the exhaust valves 76 can be activated. The camshafts 85 and 86 are made hollow, and the hollow portions define passages for circulation of engine oil (lubricating oil) L, so that the engine oil L is supplied to the sliding surfaces from predetermined oil holes.

The crankcase 31 includes an upper case 44 and a lower case 45. The upper case 44 and the cylinder block 43 are integrally molded as a single unit, and an oil pan 46 is installed below the lower case 45. The crankcase 31 rotatably supports a crankshaft 47 therein.

Figure 4:
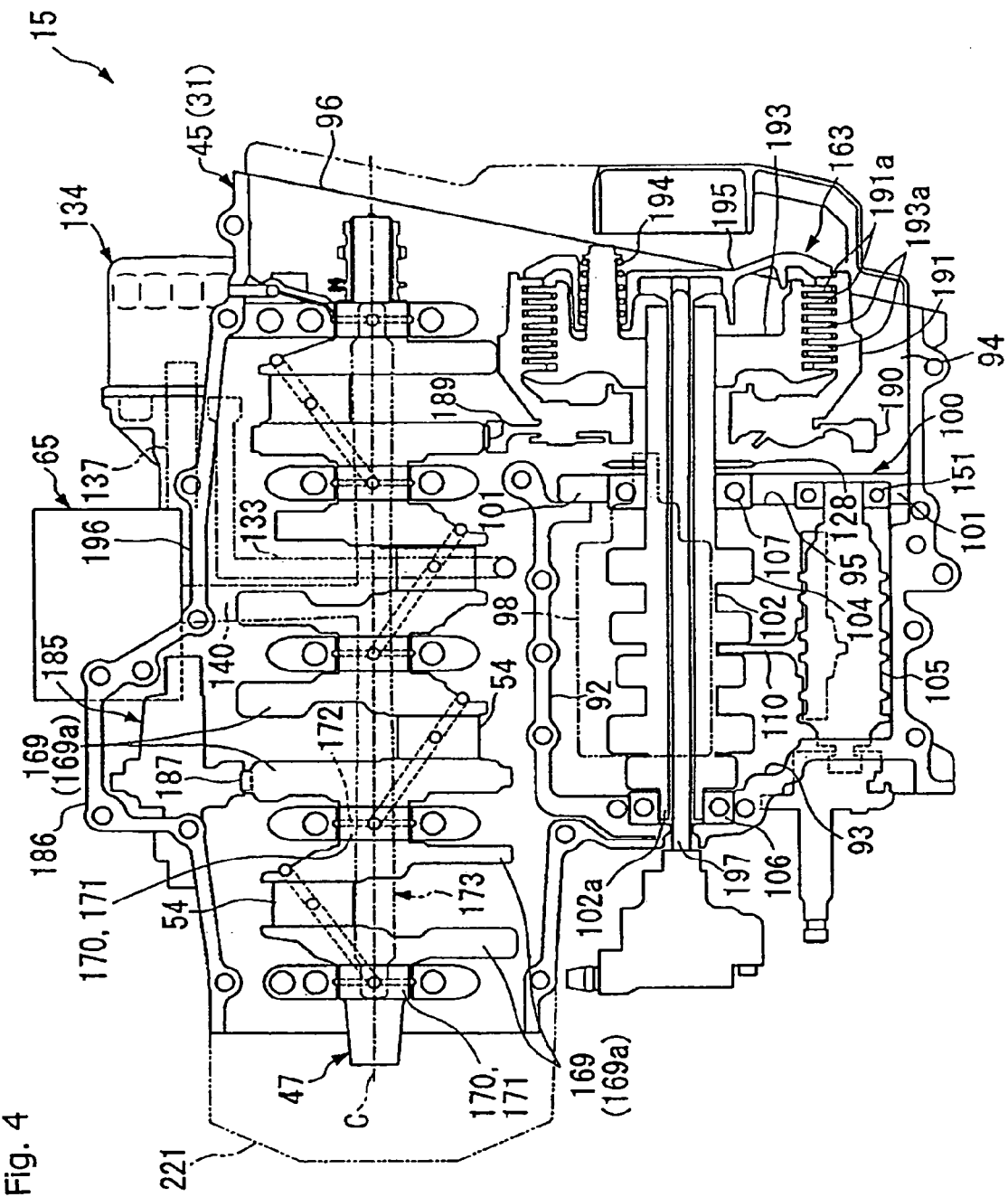
FIG. 4 is a sectional detail view of part of the powertrain of FIG. 3, taken across line A—A thereof and showing the shift drum transmission, the clutch mechanism, and the crankshaft.

As shown in FIG. 3 and FIG. 4, the crankshaft 47, having a central axis C extending in the width direction of the vehicle, is installed in the crankcase 31.

A transmission case 92 is installed in the rear portion of the crankcase 31, and a clutch housing 94 is formed on the right side of the transmission case 92. A shift drum transmission 100 is installed in the transmission case 92, and a clutch mechanism 163 is arranged in the clutch housing 94. Starting parts such as a starter motor 98 and a reduction gear 99 are arranged in the crankcase 31 above the shift drum transmission 100, so that the crankshaft 47 can be turned at the start of the engine.

Four cylinders 50 are arranged in the cylinder block 43 in the width direction of the vehicle, and a respective piston 51 is fitted in each of the cylinders 50 in a manner such that it can slide. As shown in FIG. 2, a connecting rod 53 is pivotally connected to each piston 51 by a crank pin 54, and the large end portion of the connecting rod 53 is pivotally connected to the crank pin 54 of the crankshaft 47 so that the reciprocation of the piston 51 is converted into the revolution of the crankshaft 47, with the central axis C as the center line thereof.

The crank pin 54 is supported by a pair of crank arms 169. A counter weight 169a is integrated with each of the crank arms 169 on a side opposite to the crank pin 54. A balancer drive gear 187 for activating a secondary balancer 249 is mounted on the outer wall of the crank arm 169 supporting the second crank pin 54 from the left. A primary drive gear 189 is provided on the outer wall of the crank arm 169 supporting the fourth crank pin 54 on the right side. Five journal portions 170 formed on the central axis C between the both terminal portions of the crankshaft 47, and the crank arms 169 are rotatably supported by bearings 171 provided in the upper case 44 and the lower case 45. The left end of the crankshaft 47 is covered by a generator cover 221.

A main oil gallery 173 extending in the width direction of the vehicle from one end to the other end of the crankshaft 47 is formed below the crankshaft 47 in the lower case 45. The main oil gallery 173 communicates with oil channels suitably formed in the crankshaft 47 and the bearings 171 so that engine oil L is supplied from the main oil gallery 173 to the outer surfaces of the bearing 171 and the crank pins 54. A detailed description of these oil channels will be described hereinafter.

The clutch mechanism 163 installed in the clutch housing 94 has a primary drive gear 190 which engages with the primary drive gear 189 of the crankshaft 47 and a clutch outer 191 which turns together with the primary driven gear 190. A clutch center 193, which is spline connected to the main shaft 102 of the shift drum transmission 100, and a plurality of friction boards 191a, 193a on the clutch outer 191 side and the clutch center 193 side, are provided in the clutch outer 191 so that the revolution of the crankshaft 47 is transmitted to the main shaft 102 of the shift drum transmission 100. A pressure plate 195, which is urged by a plurality of clutch springs 194, is mounted to the clutch center 193 and brings the both friction boards 191a, 193a, into pressure contact with one another so that the clutch mechanism 163 can transmit power. When the pressure plate 195 is moved in defiance of the urging force of the clutch spring 194 by the operation of a clutch lever 20a provided on the front portion of the grip of the left handlebar 20, power transmission by the clutch mechanism 163 is cut off by the separation of the both friction boards 191a, 193a.

Figure 5:
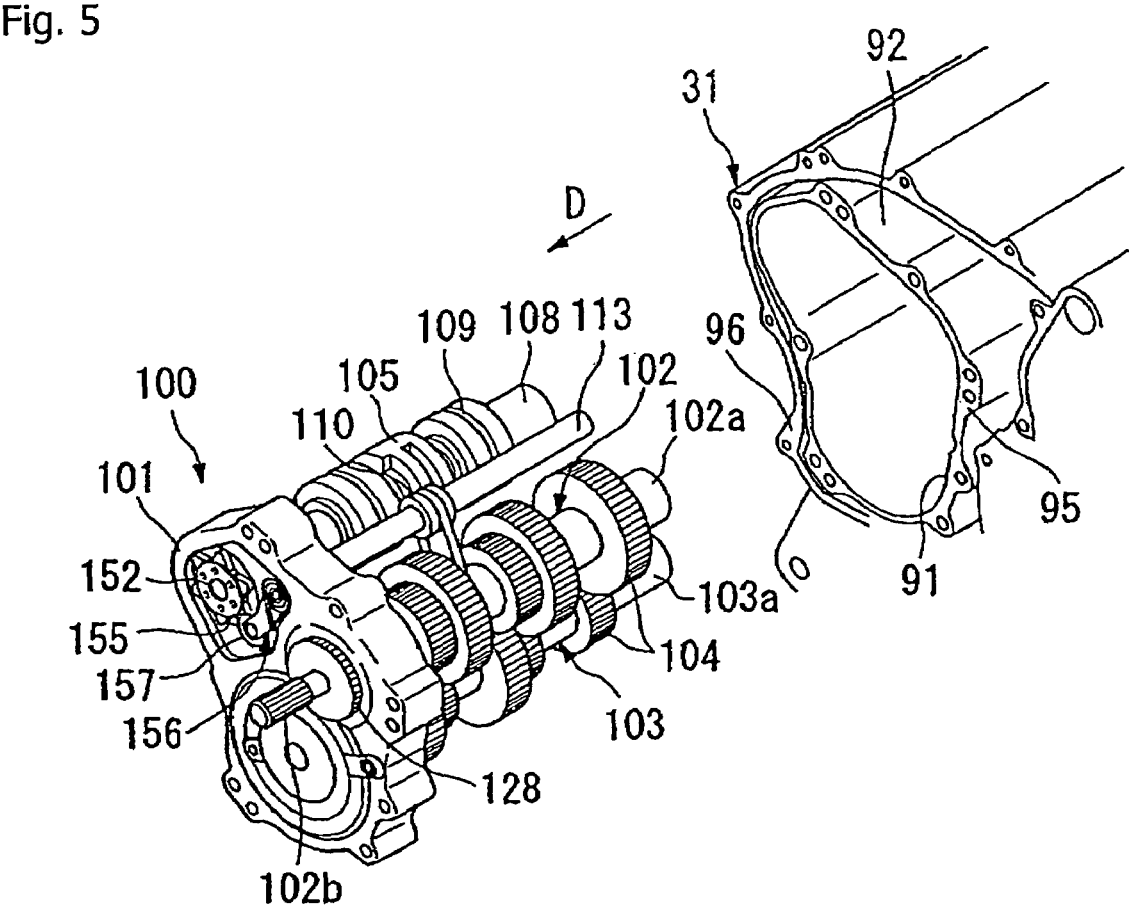
FIG. 5 illustrates the way in which the cartridge-type shift drum transmission may be attached to or detached from a crankcase.

The shift drum transmission 100 installed in the transmission case 92 is constituted as follows. FIG. 5 is a right side view of the powertrain assembly 15, showing that the shift drum transmission 100 is pulled out from the transmission case 92 in a removing direction shown by an arrow D.

As shown in FIG. 5, the shift drum transmission 100 is a cartridge-type transmission which can be detached from a transmission attachment surface 95 formed around the opening 91 of the transmission case 92. The transmission attachment surface 95 is arranged in the clutch housing 94 and positioned on the inner side of a clutch cover attachment surface 96 (see FIG. 4).

The shift drum transmission 100 has a transmission cover plate 101 attached to the transmission attachment surface 95, and the main shaft 102 is rotatably supported on the upper front side of the transmission cover plate 101 through a bearing 107 (see FIG. 4). The right end portion 102b of the main shaft 102 projects from the transmission cover plate 101, and the clutch center 193 of the clutch mechanism 163 is spline connected to the right end portion 102b.

At a position close to the transmission cover plate 101 of the right end portion 102b of the main shaft 102, an oil pump drive sprocket 128 for driving an oil pump 89 which will be described hereinafter is fixedly mounted to the main shaft 102 for concurrent movement therewith.

A countershaft 103 is rotatably supported on the lower front side of the transmission cover plate 101. That is, in this powertrain assembly 15, the crankshaft 47, the main shaft 102 and the countershaft 103 are not arranged on the same plane, and the axis of the main shaft 102 is arranged above the crankshaft 47 and the countershaft 103, thereby shortening the horizontal length of the powertrain assembly 15 and improving the degree of vehicle body design freedom.

Groups 104 of change gears which are spline mated with each other are fitted onto the main shaft 102 and the countershaft 103, respectively. A set of change gears engaged with each other are selected from the plurality of change gears constituting the change gear groups 104 to select a change gear ratio. The selection of change gears to be mated with each other is controlled by a shift drum 105 which rotatably penetrates the upper rear side of the transmission cover plate 101, and a plurality of shift forks which operate together with the shift drum 105 (only shift fork 110 is shown in FIG. 5). The shift drum transmission 100 is arranged from the inner wall of the transmission cover plate 101 toward the left side so that the axes of the rotary shafts of the shift drum 105, the main shaft 102 and the countershaft 103 are parallel to the central axis C of the crankshaft 47.

When the shift drum transmission 100 is set in the engine 30, that is, the transmission case 92, as shown in FIG. 4, the left end portion 102a of the main shaft 102 is rotatably supported on a bearing 106 installed on the left wall 93 of the crankcase 31 (transmission case 92).

Figure 14:
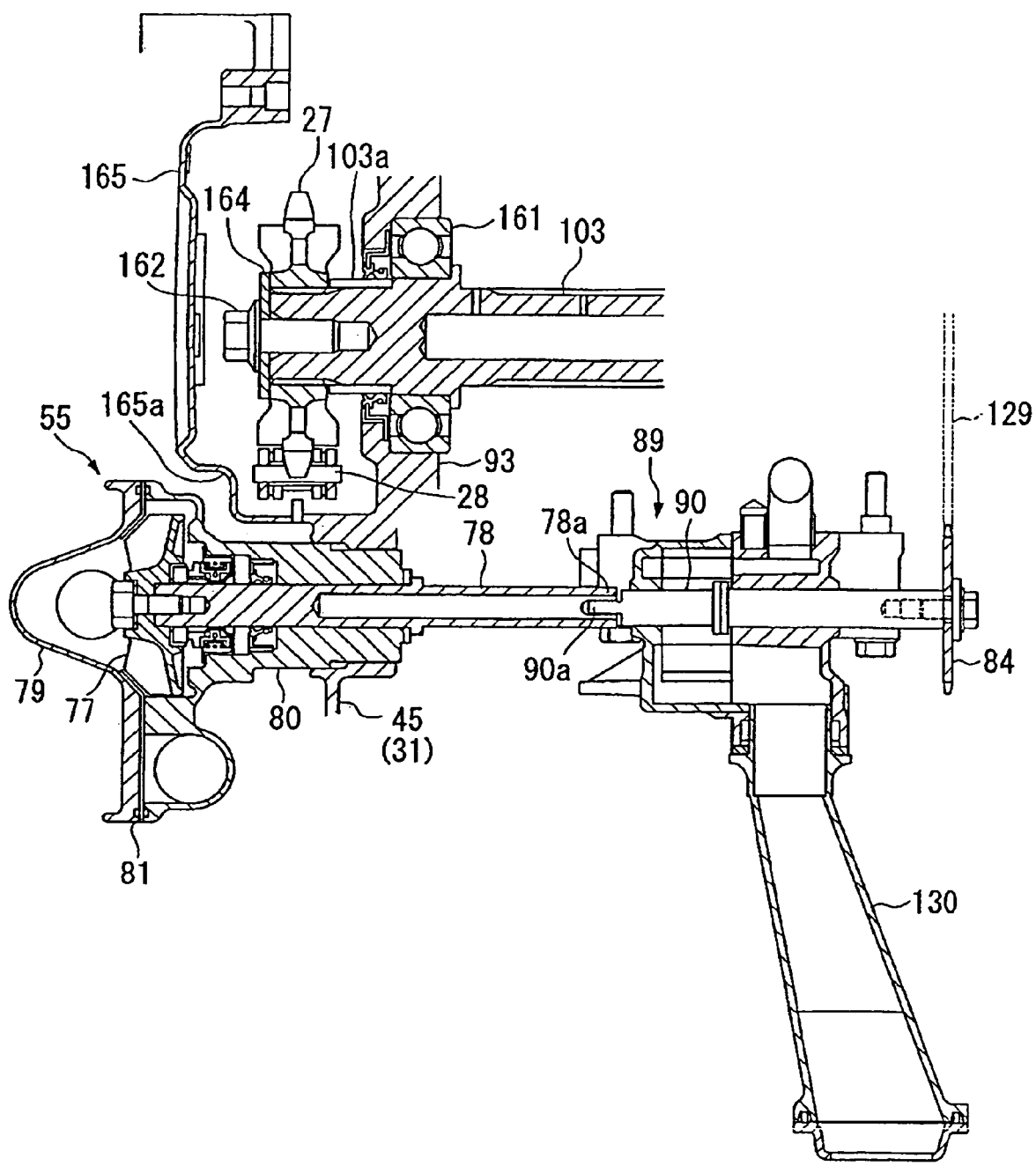
FIG. 14 is a sectional view of a water pump and an oil pump as seen across line H—H of FIG. 2.

As shown in FIG. 14, the left end portion 103a of the countershaft 103 is supported on a bearing 161 installed on the left wall 93 and penetrates the left wall 93. The drive sprocket 27 is spline fitted onto a portion projecting from the left wall 93 of the left end portion 103a. A stopper 164 fixed to the left end face of the countershaft 103 by a bolt 162 prevents the drive sprocket 27 from being separated from the countershaft 103, and the drive sprocket 27 can be removed from the countershaft 103 by removing the bolt 162 and the stopper 164. As described above, the drive sprocket 27 is connected to the rear sprocket 26 by the drive chain 28. The left end portion 108 of the shift drum 105 is supported to the left wall 93.

Further, the shift drum 105 and the mechanism for controlling the revolution of the shift drum 105 will be described in detail with reference to FIG. 6 which is a sectional view cut on line B—B of FIG. 2.

The shift drum 105 is substantially columnar and has a plurality of grooves on the external wall. One end of each of the respective shift forks 110, 111 and 112 are engaged with the grooves 109. The other ends of the shift forks 110, 111 and 112 fork and engage with the change gear groups 104. Further, a shift fork shaft 113 arranged parallel to the axis of the shift drum 105 penetrates the shift fork 110. Similarly, a shift fork shaft 114 arranged parallel to the axis of the shift drum 105 penetrates the shift forks 111 and 112.

A bearing 115 is installed on the left end portion 108 of the shift drum 105 so that the shift drum 105 is rotatably supported on the left wall 93 of the crankcase 31. A shift plate 117 is fixed to the left end face by a bolt 118. Knock pins 119 are inserted into the junction between this shift plate 117 and the left end portion 108 so that the shift plate 117 and the shift drum 105 can turn together.

The shift plate 117 is circular when viewed from the side of the engine. Its center is fixed by the bolt 118, and it has six through holes 120 on a concentric circle at equal intervals. The through holes 120 are formed parallel to the axis of the shift drum 105, and a drum pin 121 is inserted into each of the through holes 120 from the inner side toward the outer side (left side) in the axial direction of the shift drum 105. The projection direction of the drum pin 121 is opposite to the removing direction of the shift drum transmission 100 shown by the arrow D in FIG. 6, and the engagement claw 123 of the shift arm 122 is engaged with at least one of the six projecting drum pins 121 from the outer side in the width direction of the powertrain assembly 15 (shift drum transmission 100).

The shift arm 122 is thin and long in the horizontal direction of the powertrain assembly 15, and the engagement claw 123 projects from the shift arm 122 toward the shift drum 105 on the rear side and fixed to the change spindle 124 on the front side. This change spindle 124 is rotatably supported on the left wall 93 of the crankcase 31, and a coil shift return spring 125 is fitted onto the change spindle 124. The shift arm 122 has a slit 127 above and behind the change spindle 124, and a stopper pin 126 fixed to the left wall 93 is loosely mated with the slit 127. This stopper pin 126 is engaged with one end of the shift return spring 125 from above to provide urging force in the radial direction (direction opposite to a direction shown by an arrow E in FIG. 2) to the shift arm 122. Since the stopper pin 126 is inserted into the slit 127 formed in the shift arm 122, the revolution of the shift arm 122 is limited by the stopper pin 126.

The change spindle 124 penetrates a gearshift link cage cover 222 covering the shift arm 122. As shown in FIG. 2, the front end of a link member 145 is fixed to the change spindle 124. This link member 145 extends backward from one end along the powertrain assembly 15 and is connected to the top portion of a rod 147 by a pin 146 at the other end. The lower portion of the rod 147 is connected to a shift lever 148 for shift change attached to the powertrain assembly 15 in a manner such that it can move. The connection portion between the lower portion of the rod 147 and the shift lever 148 is interposed between a pin 130 which is the center of movement and a working point stepped on by the driver. The above shift lever 148, the rod 147, the link member 145, the change spindle 124 and the shift arm 122 are arranged on the left side of the powertrain assembly 15.

Figure 6:
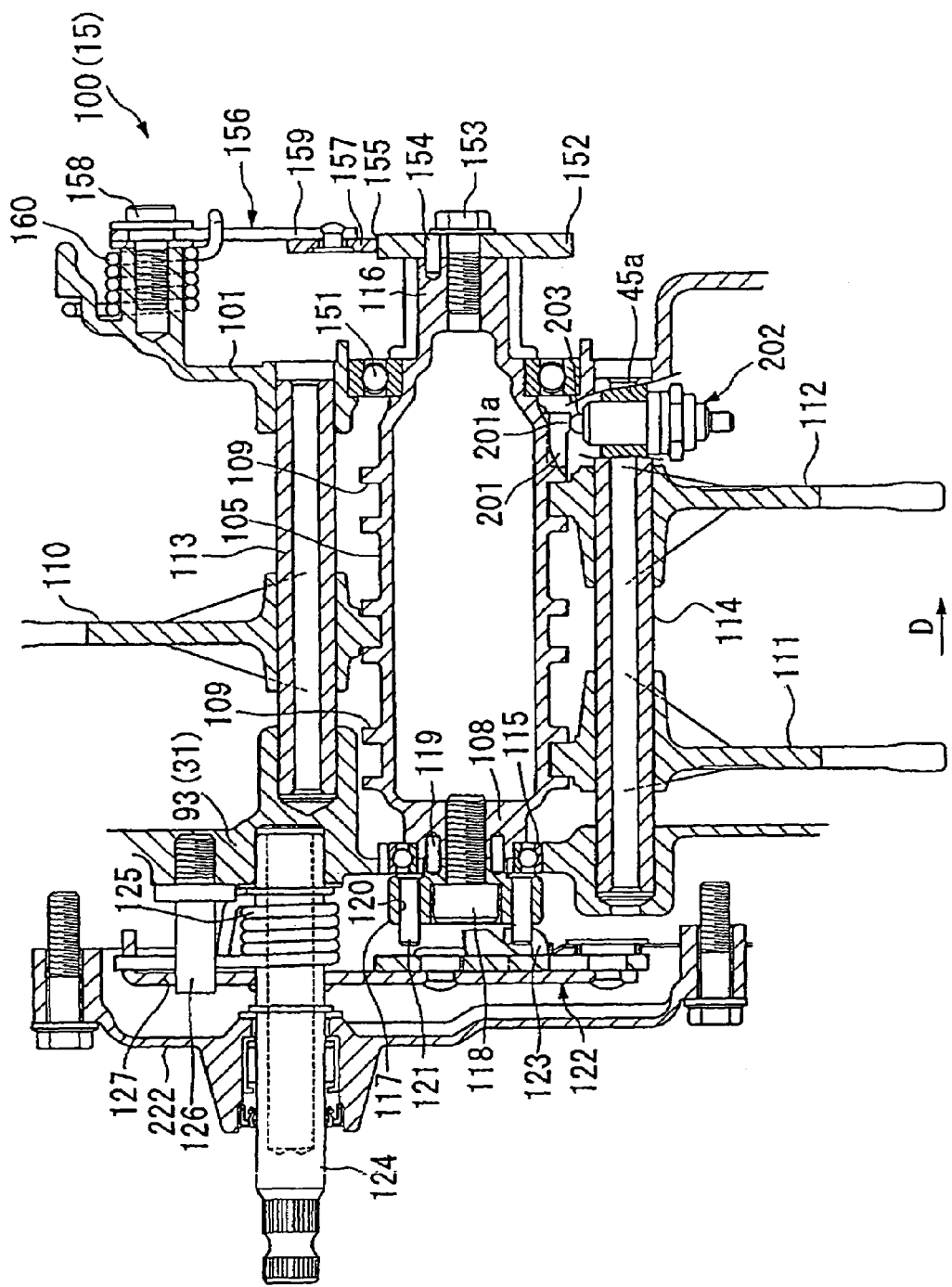
FIG. 6 is a detail sectional view of the powertrain of FIGS. 2–3, taken across line B—B of FIG. 2 and illustrating the shift drum of the shift drum transmission.

As shown in FIG. 6, the right end portion 116 of the shift drum 105 is rotatably supported on the transmission cover plate 101 by a bearing 151 and penetrates the transmission cover plate 101. The stopper plate 152 is fixed to the right end face of the shift drum 105 by a bolt 153 to limit the revolution of the shift drum 105. A knock pin 154 is press fitted into the junction between the stopper plate 152 and the right end portion 116 so that the stopper plate 152 and the shift drum 105 turn together.

The stopper plate 152 has curved grooves 155 at the periphery, and its center portion is fixed by the bolt 153. As shown in FIG. 3, the stopper plate 152 is a stopper plate which can change the speed of the shift drum transmission 100 to six levels and has a substantially star-like shape with six grooves 155 corresponding to the above drum pins 121. The stopper roller 157 of a stopper roller assembly 156 is brought into elastic contact with one of the grooves 155. As shown in FIG. 6, the stopper roller assembly 156 is constituted such that a lever member 159 is movably mounted to a bolt 158 projecting from the transmission cover plate 101, and the stopper roller 157 is rotatably mounted on the end of the lever member 159. A coil-like return spring 160 is fitted onto the bolt 158 to urge the lever member 159 in a direction that the stopper roller 157 is pressed against the stopper plate 152.

The shift drum 105 has a cam face 201 on the right outer wall on the inner side of the bearing 151. The cam face 201 has projections (cams) 201a corresponding to all the gear positions, including "neutral". Further, a sensor 202 for detecting the revolution position of the shift drum 105 is attached to the wall 45a of the rear portion of the lower case 45 at a position corresponding to this cam face 201. This sensor 202 is attached to the wall 45a from the outer side and a detection pin 203 at the end of the sensor 202 is in contact with the cam face 201 in a direction substantially perpendicular to the cam face 201 (or the axis of the shift drum 105).

Figure 7:
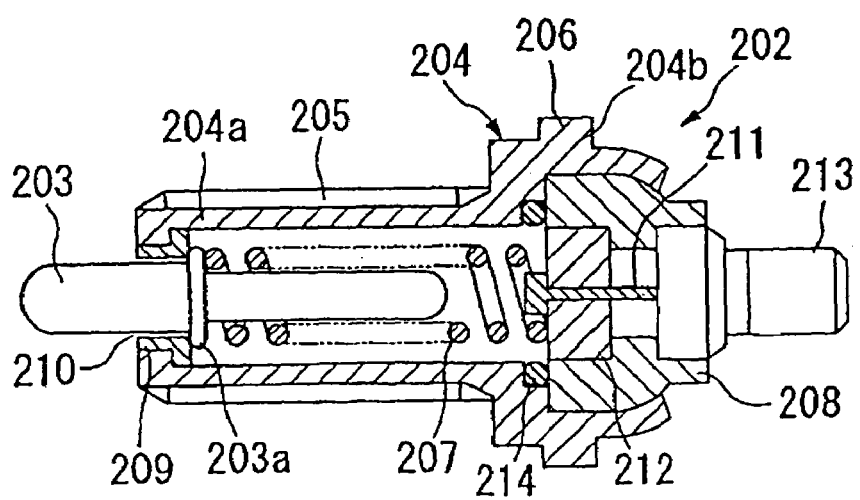
FIG. 7 is a sectional view of a sensor used to sense the position of the shift drum.

As shown in FIG. 7, the sensor 202 has a hollow cylindrical body portion 204, a rear portion 204b is expanded to a larger diameter than a front portion 204a forming a male screw 205 by step molding, and a hexagonal portion 206 to which a spanner is applied is formed on the rear portion 204b. Further, the detection pin 203, a coil spring 207 and a base terminal 208 are inserted into the body portion 204 from the rear portion 204b, having a large diameter, one after another.

The detection pin 203 has a globular end and a collar portion 203a having an expanded diameter between one end and the other on the outer surface. Since the diameter of the collar portion 203a is smaller than the opening diameter of the open end 210 on the front portion 204a side of the body portion 204, the detection pin 203 does not fall off from the opening end 210. The detection pin 203 is made of a conductive material and a sleeve 209 made of an insulating material is inserted into the opening end 210.

Since one end of the coil spring 207 is brought into contact with the collar portion 203a of the detection pin 203 from the rear portion 204b side, the detection pin 203 is always urged toward the opening end 210 (cam face 201). The other end of the spring 207 is in contact with the insulating member 212 of the base terminal 208. The base terminal 208 has a conductive contact member 211 on the axis of the sensor 202, which is surrounded by the insulating material 212. The contact member 211 is connected to a current detection terminal 213, and the whole base terminal 208 is fitted into the rear portion 204b of the body portion 204 by calking. An O-ring 214 is inserted into the gap between a stepped portion in the hollow portion and the base terminal 208.

As shown in FIGS. 3 and 14, the oil pump 89 for supplying an engine oil L by pressure is installed in the lower portion of the clutch housing 94 in the lower portion of the crankcase 31. An oil pump driven sprocket 84 is fitted onto the oil pump shaft 90 of the oil pump 89 and coupled with the oil pump driven sprocket 128 which turns together with the main shaft 102 of the shift drum transmission 100 by a chain 129, and the oil pump 89 is started by the revolution of the crankshaft 47. That is, the oil pump 89 is driven by the chain 129 between it and the main shaft 102 of the shift drum transmission 100.

The oil pump 89 is arranged below the transmission attachment face 95 of the crankcase 31 in a manner such that it does not overlap with the transmission attachment face 95 when viewed from the side of the powertrain assembly 15. Thereby, when the shift drum transmission 100 is to be removed from the crankcase 31, even if the shift drum transmission 100 is pulled out straight in the axial direction (that is, the direction shown by the arrow D in FIG. 5) of the main shaft 102, the shift drum transmission 100 does not interfere with the oil pump 89.

Further, the oil pump 89 is arranged such that it does not overlap with the clutch outer 191 and primary driven gear 190 of the clutch mechanism 163 when viewed from the side of the powertrain assembly 15. Thereby, in the engine in which the shift drum transmission 100 and the clutch mechanism 163 are arranged on the same axis, when viewed from the side of the engine, the shift drum transmission 100 and the clutch mechanism 163 can be positioned very close to each other, thereby making it possible to reduce the projection size of the clutch mechanism 163 in the powertrain assembly 15. As a result, the size in the vehicle width direction of the powertrain assembly 15 (that is, the width of the powertrain assembly 15) can be reduced.

As shown in FIG. 3, the chain 129 put between the oil pump driven sprocket 84 and the oil pump drive sprocket 128 is arranged such that it overlaps with the countershaft 103, the transmission attachment face 95, and the clutch cover attachment face 96, when viewed from the side of the powertrain assembly 15.

A trumpet-like suction pipe 149 (FIGS. 3 and 11) expanding toward the oil pan 46 fixed to the lower portion of the lower case 45 is connected to the suction port of the oil pump 89. A strainer 131 is attached to the lower end of the suction pipe 149. The lower portions of the strainer 131 and the suction pipe 149 are immersed in the engine oil L contained in the oil pan 46.

A cartridge-type oil filter 134 is detachably installed on the right side of the lower case 45, and a water-cooled heat exchanger 65 is installed on the front wall 196 of the lower case 45.

The engine oil L sucked up by the oil pump 89 is supplied to the oil filter 134 through an oil channel 133. The engine oil L cleaned by the oil filter 134 is supplied to the oil cooler 65 through an oil channel 137 to be cooled by coolant. The cooled engine oil L is supplied to the main oil gallery 173 through an oil channel 140 and distributed to the bearings of the crankcase 31 to lubricate and cool the rotating and sliding parts of the crankshaft 47. A relief valve 142 is connected to the lower end of an oil channel 141 branching off from the oil channel 133. The relief valve 142 is activated when the oil pressure of the engine oil L rises to a predetermined value to release the oil pressure.

A detailed description is subsequently given of each oil channel. Arrows in FIGS. 8 to 12 denote flows of the engine oil L.

Figure 8:
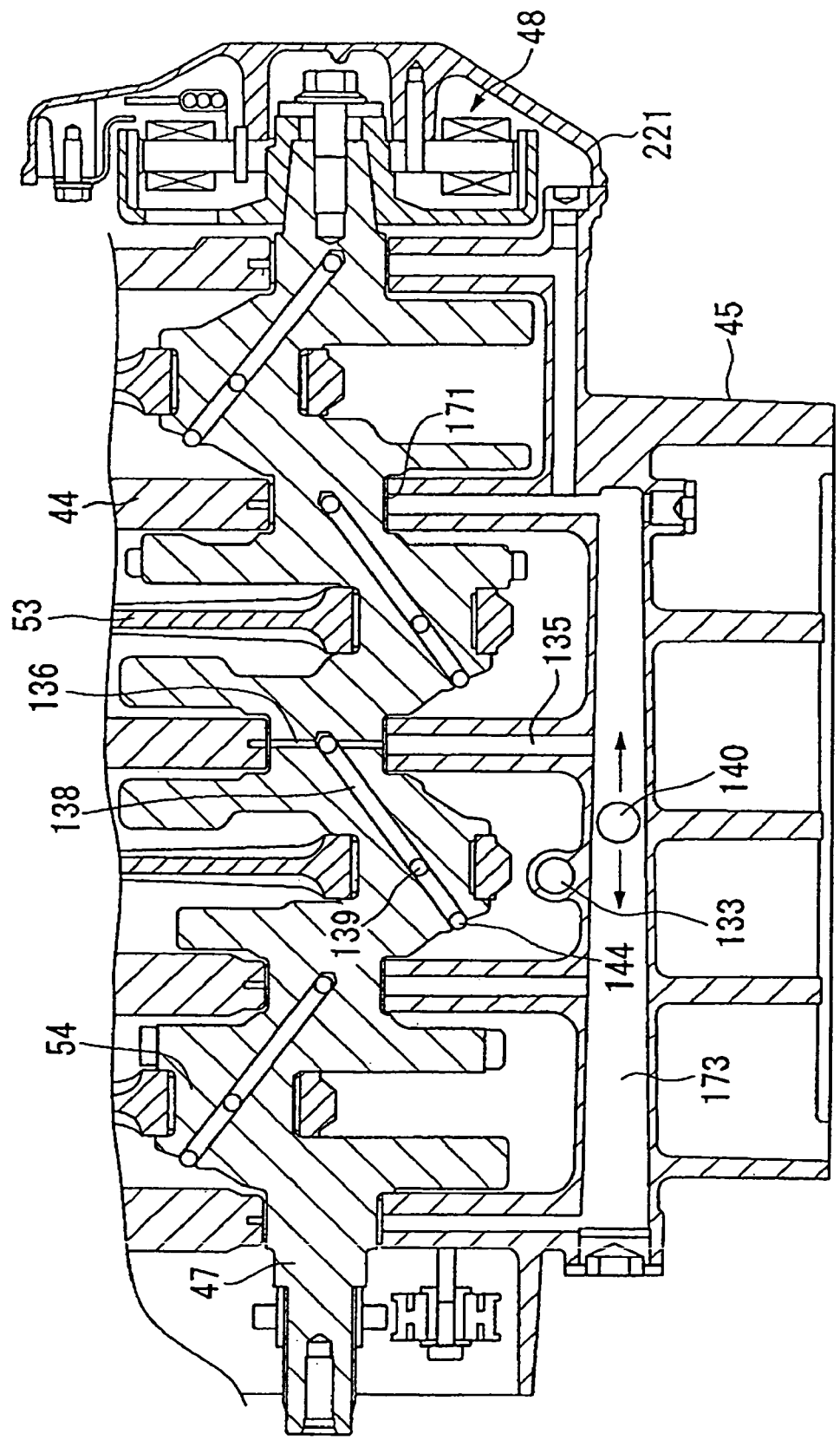
FIG. 8 is a sectional view of the powertrain of FIGS. 2–3, taken across line F—F of FIG. 3 and showing oil flow pathways.

FIG. 8 is a sectional view cut on line F—F of FIG. 3 and a cross sectional front view of the crankcase 31. As described above, the main oil gallery 173 extending in the vehicle width direction is formed below the crankshaft 47 of the lower case 45, and the oil channel 140 is connected to the substantially center portion of the main oil gallery 173. Oil channels 135 extend from the main oil gallery 173 toward the bearings 171 of the lower case 45. The oil channel 133 is laid above the substantially center portion of the main oil gallery 173 separately in a direction perpendicular to the main oil gallery 173.

The crankshaft 47 has an oil channel 136 in a direction perpendicular to the axial direction of the crankshaft 47 in a portion supported by the bearings 171. An inclined oil channel 138, which communicates with the above oil channel 136, is formed in the inside of each of the crank pins 54. An oil channel 139 crossing the crank pin 54 and communicating with the oil channel 138 is further formed. An open end formed when the oil channel 138 is formed is closed by press fitting a steel ball 144 therein. In FIG. 8, a generator 48 is fitted onto the end of the crankshaft 47.

The engine oil L supplied into the main oil gallery 173 through the oil channel 140 is further fed to the bearings 171 through the oil channels 135 to lubricate the sliding parts of the crankshaft 47. Further, the engine oil L is supplied into the spaces between the crank pins 54 and the large diameter portions of the connecting rods 53 through the oil channels 136, oil channels 138 and oil channels 139.

Figure 9:
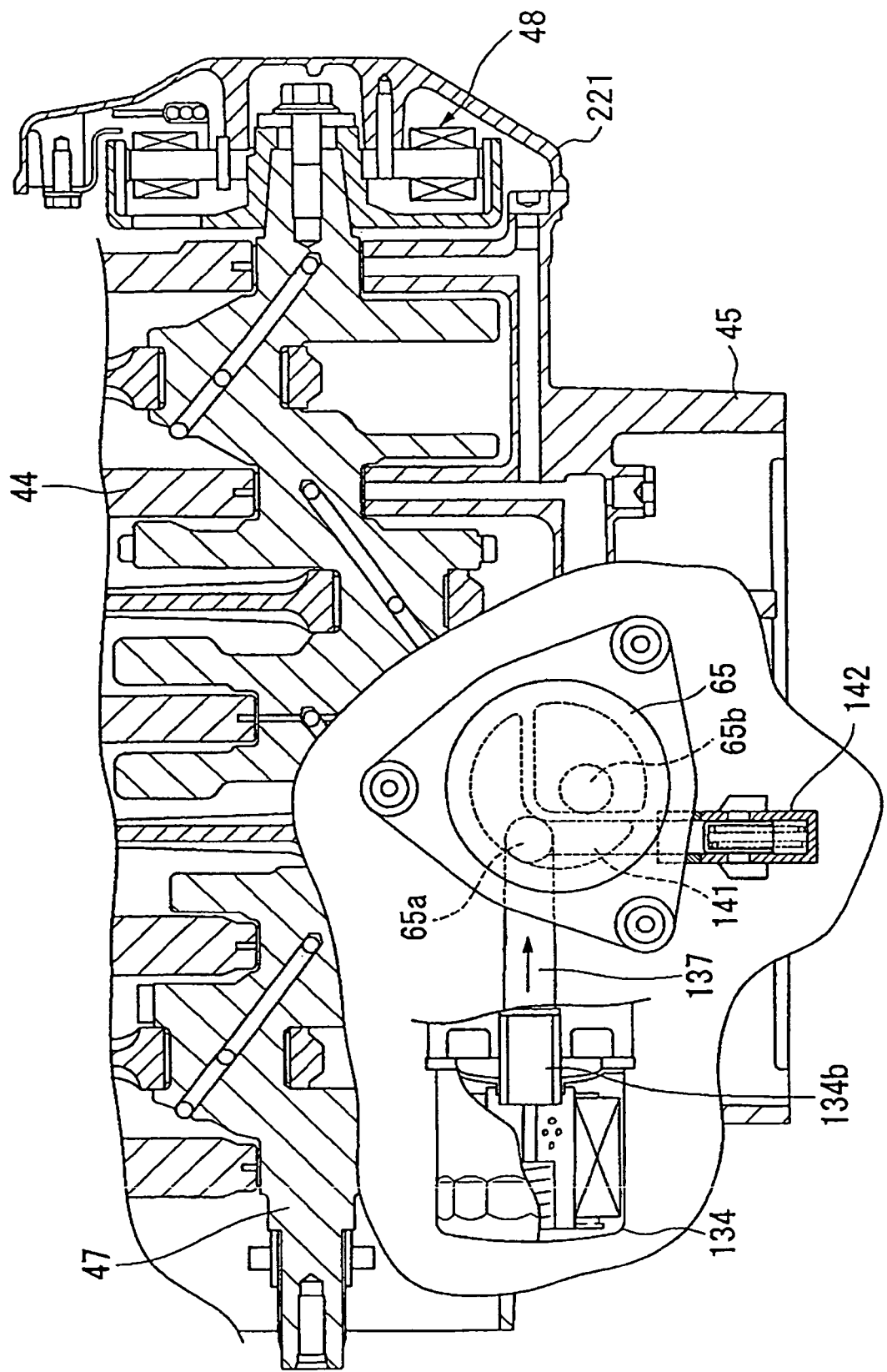
FIG. 9 is a front view of an oil cooler when seen from a direction shown by an arrow G in FIG. 3, also showing part of the powertrain in a cross-sectional view similar to FIG. 8.

FIG. 9 shows the oil filter 134, oil cooler 65 and related oil channels when seen from a direction shown by an arrow G in FIG. 3, which are displayed at corresponding positions in FIG. 8. The oil outlet 134b of the oil filter 134 and the oil inlet 65a of the oil cooler 65 are connected by the oil channel 137 described above. The oil outlet 65b of the oil cooler 65 and the main oil gallery 173 are connected by the oil channel 140 described above.

Figure 10:
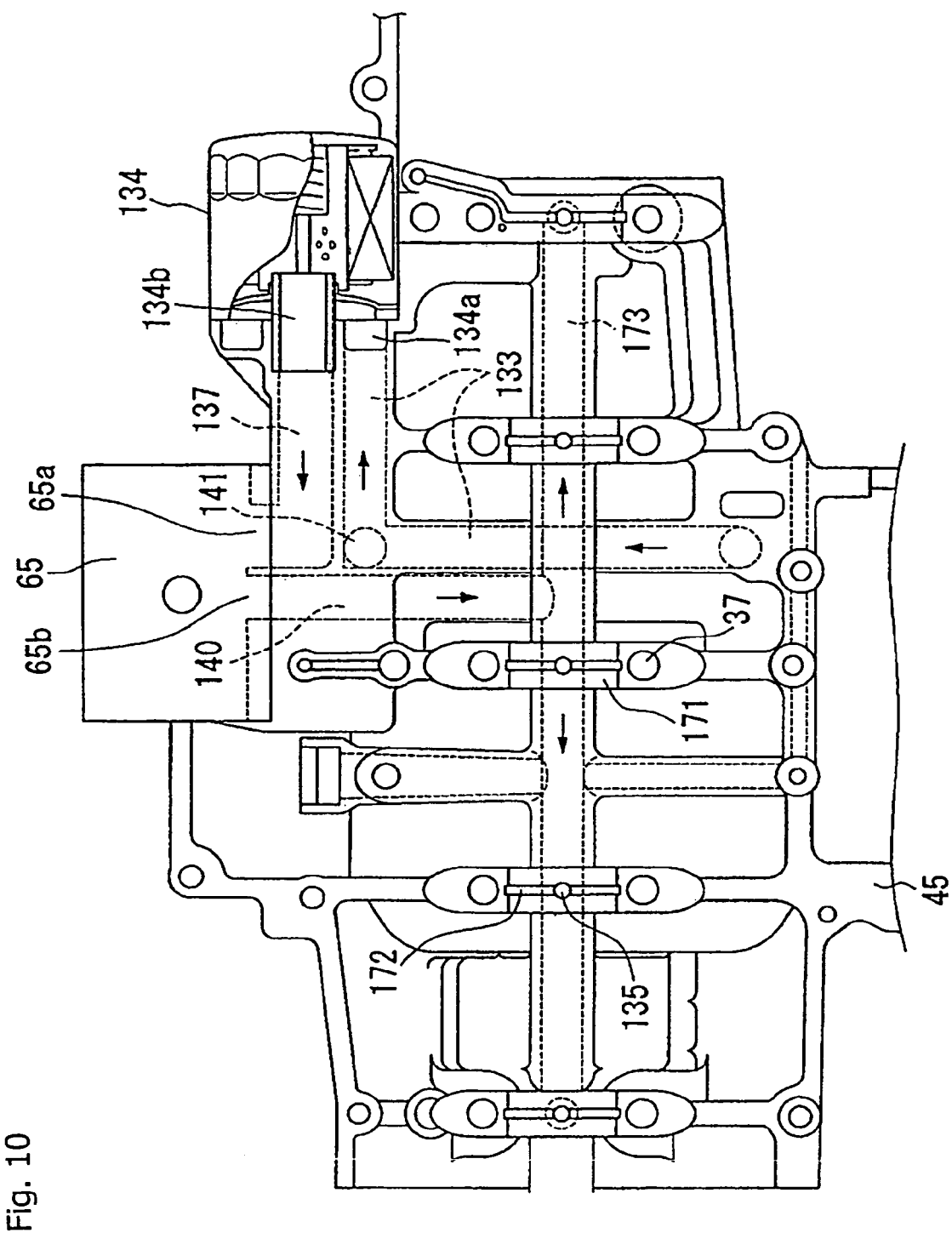
FIG. 10 is a sectional view of the powertrain of FIGS. 2–3, taken across line A—A of FIG. 3 with the crankshaft removed from the drawing, showing oil flow pathways.

FIG. 10 shows the oil filter 134, oil cooler 65 and related oil channels in the sectional view cut on line A—A of FIG. 3, which shows that the crankshaft 47 is removed. The oil channel 133, which is laid below the main oil gallery 173 separately in a direction perpendicular thereto, is connected to the oil inlet 134a of the oil filter 134. The above-described oil channel 141 branches off downward from the curved portion of the oil channel 133, and the relief valve 142 is connected to the end of the oil channel 141. The above oil channel 135 which communicates with the main oil gallery 173 is open to the center of each of the bearings 171 of the lower case 45, and a slit 172 is formed on both sides of the oil channel 135. A respective slit, similar to the slit shown at 172, is formed in each of the bearings 171 of the upper case 44. Reference numeral 37 denotes a bolt hole for accepting a bolt for connecting the upper and lower bearings 171 of the upper case 44 and the lower case 45 in a loop.

Figure 11:
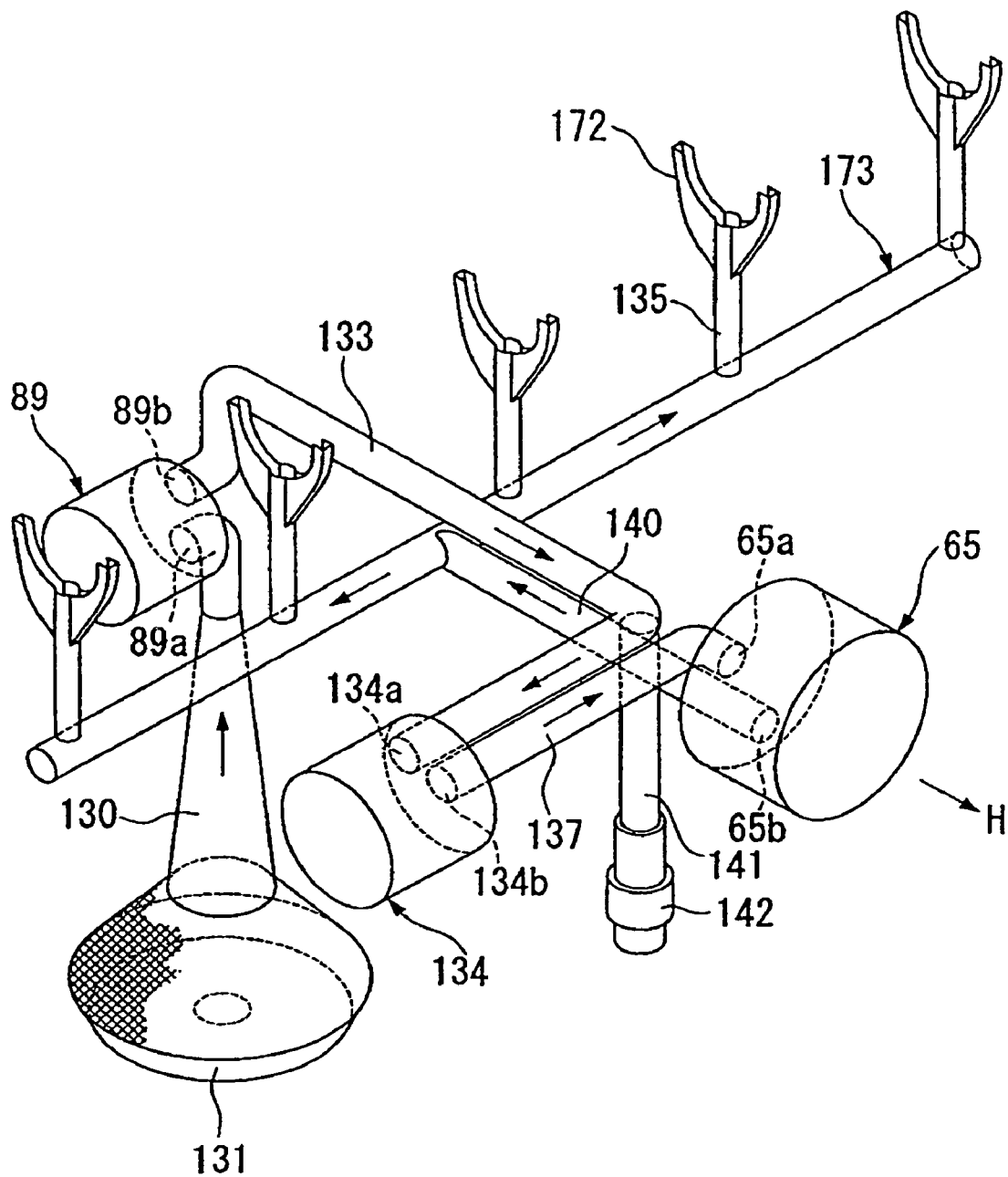
FIG. 11 is a diagrammatic perspective view of oil channels within the powertrain of FIGS. 2–3, shown isolated from the powertrain for purposes of illustration.

FIG. 11 is a perspective isolated view of the connections of the above oil channels. In FIG. 11, the arrow H denotes the forward direction. The engine oil L absorbed through the strainer 131 flows into the oil pump 89 from an oil inlet 89a through the suction pipe 149. The engine oil L whose pressure is increased by the oil pump 89 flows out from an oil outlet 89b and flows into the oil filter 134 from an oil inlet 134a through the oil channel 133. The engine oil L cleaned by the oil filter 134 flows out from an oil outlet 134b and flows into the oil cooler 65 from an oil inlet 65a through the oil channel 137. The engine oil L cooled by the oil cooler 65 flows into the substantially center portion of the main oil gallery 173 from an oil outlet 65b through the oil channel 140.

The engine oil L flowing into the main oil gallery 173 is almost uniformly distributed into the five oil channels 135 to be supplied to the bearings 171 through the oil channels 135 and the slits 172. The engine oil L supplied to the sliding parts of the powertrain assembly 15 is dropped on the oil pan 46 by itself and stored. When excessive pressure is generated in the engine oil L by the oil pump 89, the excess oil pressure is released from the relief valve 142 connected to the oil channel 141. The engine oil L released from the relief valve 142 returns to the oil pan 46. The oil channels 133, 135, 137, 140, 141, 172 and 173 are formed in the crankcase 31.

Figure 12:
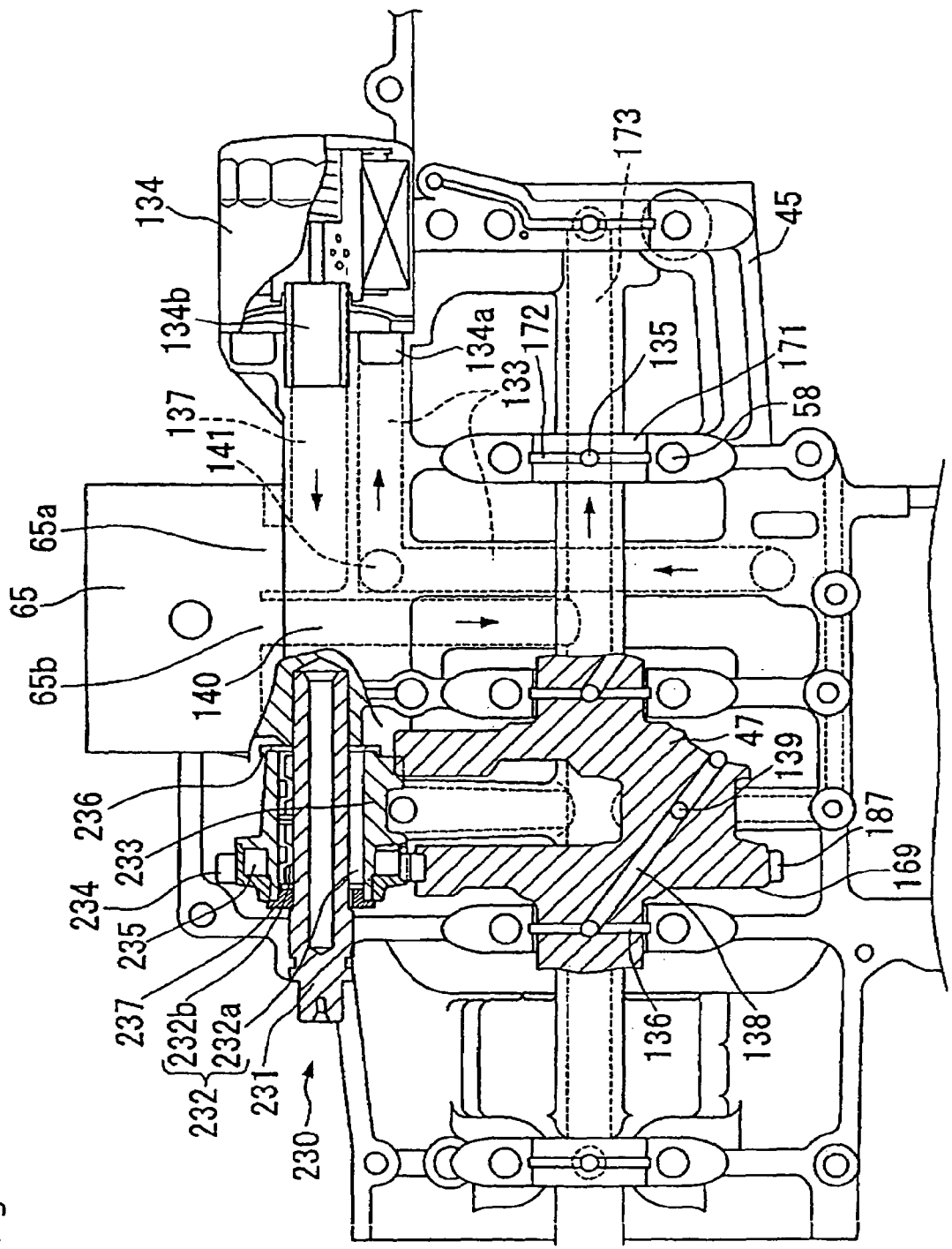
FIG. 12 is a sectional view of part of a crankshaft and a key section of a secondary balancer when seen from a direction A—A in FIG. 3.
Figure 13:
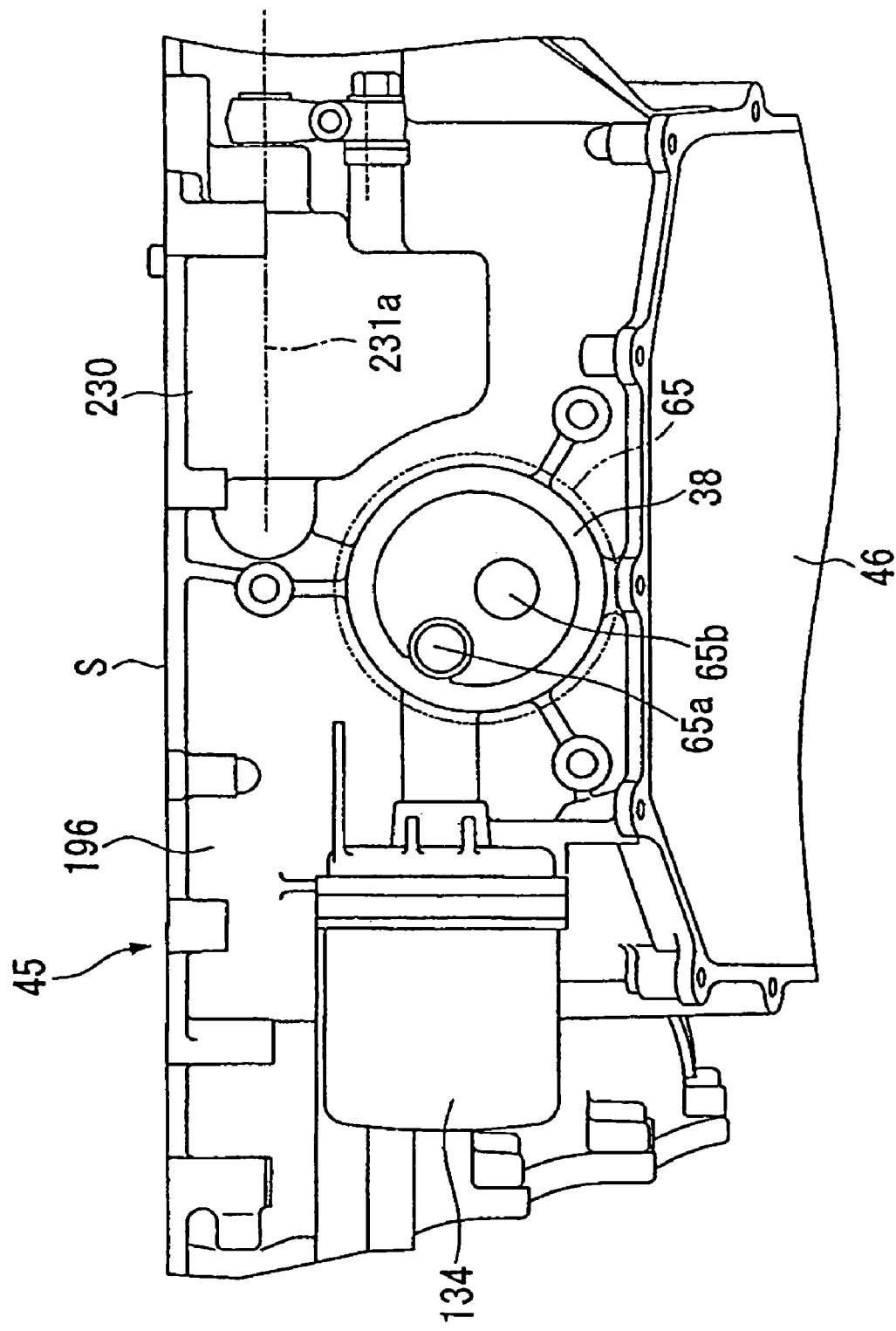
FIG. 13 is a front view of a lower case portion of the powertrain of FIGS. 2–3.

FIG. 12 shows part of the crankshaft 47 and the secondary balancer 249 when seen from the direction A—A of FIG. 3 at corresponding positions in the lower case 45 of FIG. 10. FIG. 12 shows the sections of the crankshaft 47 and the secondary balancer 249. In FIG. 12, the secondary balancer 249 is situated in front of the inner cylinders out of the four cylinders. A balancer shaft 231 is fixed and supported to the front wall of the lower case 45, and the axis 231a of the balancer shaft 231 is located slightly below the vertical divided face S of the crankcase 31 as shown in the front view of the lower case of FIG. 13. In FIG. 13, reference numeral 38 denotes the bearing surface of the oil cooler 65.

A balance weight 233 is rotatably held on the outer wall of the balancer shaft 231 through a needle bearing 232 which consists of a needle 232a and a needle holder 232b. A balancer slave gear 234 is fitted onto the wall of the boss portion of the balance weight 233, next to the weight portion, and the balance weight 233 and the balancer slave gear 234 turn together through a mating portion 235. The movements in the axial direction of both ends of the balance weight 233 are limited by side washers 236 and 237 together with the balancer slave gear 234. As described above, the balancer drive gear 187 is provided on the outer wall of one of the crank arms 169 of the crankshaft 47, and the balancer slave gear 234 is engaged with this balancer drive gear 187. The number of teeth of the balancer drive gear 187 is double that of the balancer slave gear 234, whereby the revolution of the crankshaft 47 is transmitted to the balancer weight 233 by the balancer drive gear 187 and the balancer slave gear 234 to drive the balancer weight 233 at a revolution double that of the crankshaft 47, thereby canceling secondary vibration.

Figure 15:
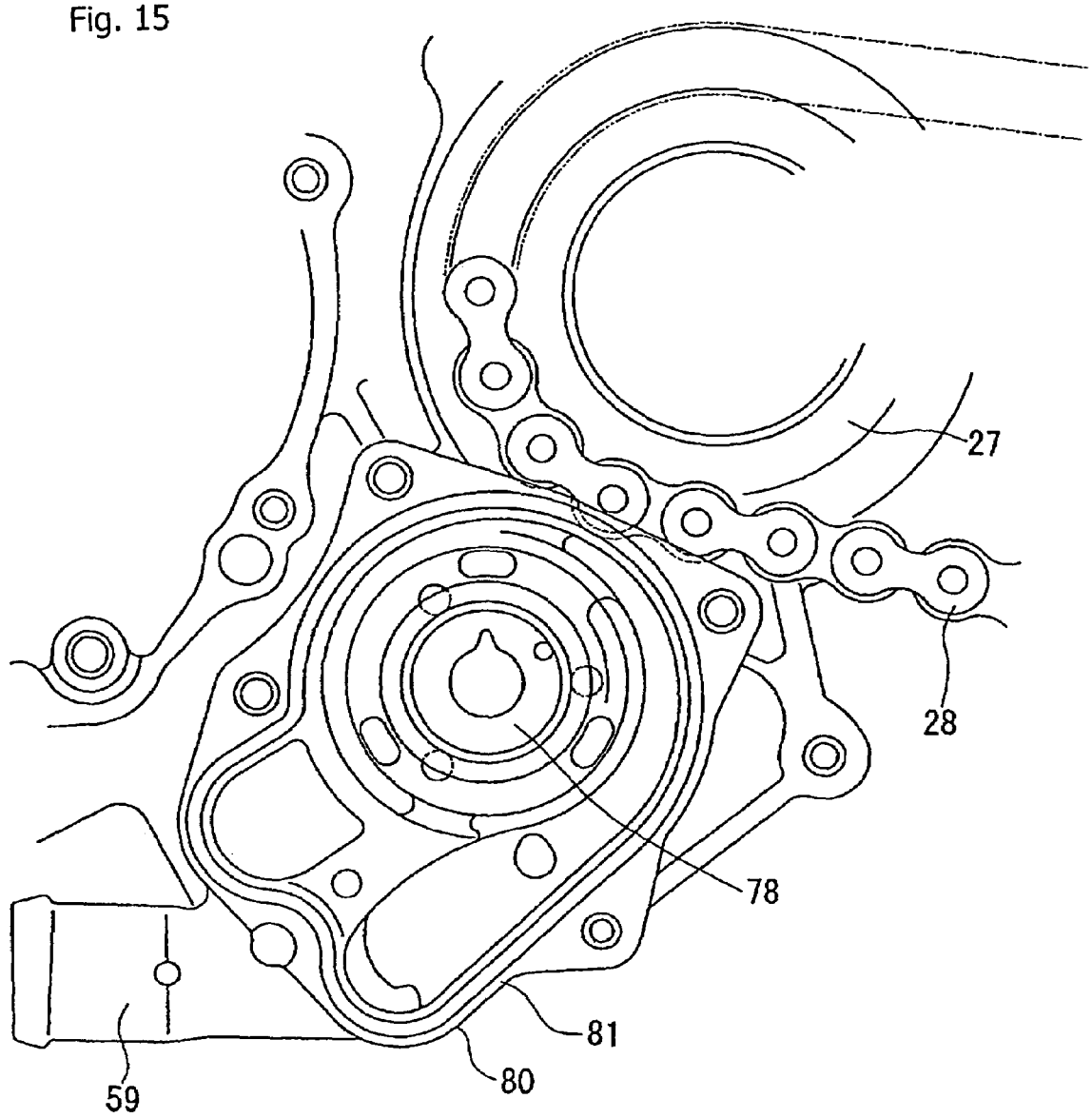
FIG. 15 is a partial left side view of the crankcase of the powertrain hereof, with the casing cover of the water pump removed from the drawing for illustrative purposes.

As shown in FIG. 2 and FIG. 14, the water pump 55 is installed on the left wall of the lower case 45 below the drive sprocket 27 and as shown in FIG. 15, part of the upper edge of the water pump 55 overlaps with the chain line on the drive sprocket 27 side of the drive chain 28 in the side view of the engine. Further, part of the upper edge of the water pump 55 overlaps with the lower portion of the drive sprocket cover 165 for covering the drive sprocket 27 in the side view of the engine. A recessed portion 165a is formed in the drive sprocket cover 165 to avoid interference with the water pump 55 so that the water pump 55 can be brought close to the drive sprocket 27 in the vehicle width direction and the vertical direction.

A water pump shaft 78 for driving the impeller 77 of the water pump 55 is arranged coaxial to the oil pump shaft 90 of the oil pump 89. The right end portion 78a of the water pump shaft 78 is mated with the left end portion 90a of the oil pump shaft 90 and the water pump shaft 78 and the oil pump shaft 90 are substantially coaxial to each other, whereby the water pump shaft 78 turns in synchronism with the oil pump shaft 90. Therefore, the water pump 55 is driven by the main shaft 102 of the shift drum transmission 100 through the oil pump driven sprocket 84 and the chain 129 and starts operation by the revolution of the crankshaft 47.

The reason that the water pump 55 is installed as described above is given below. When the main shaft 102 and the countershaft 103 are spaced apart from each other in the vertical direction like the shift drum transmission 100, the countershaft 103 can be installed near the crankshaft 47, thereby making it possible to reduce the size of the engine in the horizontal direction. When the location of the water pump 55 is considered so as to eliminate its interference with the drive sprocket 27, it is conceivable that the water pump 55 can be installed below the drive sprocket 27 and not to overlap with the drive sprocket 27 completely when viewed from the side of the engine. When the water pump 55 is positioned as described above, the width of the portion below the powertrain assembly 15 increases and the banking angle while driving may be limited. When the water pump 55 is installed above the drive sprocket 27, the width of a portion below the powertrain assembly 15 can be reduced but a heavy object is biased above the powertrain assembly 15 disadvantageously.

When the water pump 55 and the oil pump 89 are substantially coaxial to each other (FIG. 14), the water pump 55 is installed below the drive sprocket 27, and a recessed portion 165a is formed in the drive sprocket cover 165 to eliminate interference between the drive sprocket cover 165 and the water pump 55. Then the chain line on the drive sprocket 27 side of the drive chain 28 and the water pump 55 overlap with each other, when viewed from the side the engine, while substantial interference between them is eliminated. The water pump 55 can be brought close to the drive chain 28, and the heavy water pump 55 and the heavy oil pump 89 do not need to be installed at very high positions. In addition, an increase in the width of the portion below the powertrain assembly 15 can be suppressed, thereby making it possible to obtain a large banking angle while driving.

FIG. 14 is a sectional view of the water pump 55 and the oil pump 89 along line H—H of FIG. 2, and FIG. 15 is a left side view of the inside of the crankcase 31 when the casing cover 79 of the water pump 55 is removed. In FIG. 15, reference numeral 81 is the mating face between the casing cover 79 and the casing body 80 of the water pump 55.

A coolant introduction hose 58 for introducing coolant from the radiator 36 (see FIG. 1) and a bypass hose 64 are connected to the water pump 55. Coolant from the radiator 36 is introduced into the water pump 55 through the coolant introduction hose 58 to be pressurized by the water pump 55, supplied into a cylinder-side water jacket 57 through a coolant delivery hose 59, flows out from a coolant outlet port 61 formed in a head-side water jacket 60 behind the cylinder head 40, and returns to the radiator 36 through a thermostat 62 and a radiator circulating hose 69. When the temperature of the coolant passing through the thermostat 62 is a predetermined value or lower, the coolant returns to the water pump 55 from the thermostat 62 through the bypass hose 64 and circulates without the radiator 36. Part of the coolant which is supplied by pressure is fed to the oil cooler 65 through the introduction hose 68 as shown in FIG. 3 and circulates in the oil cooler 65 to cool the engine oil L and then returns to the water pump 55 through the introduction hose 67.

A description is subsequently given of the function of the shift drum transmission 100. When the powertrain assembly 15 starts running, the revolution of the crankshaft 47 shown in FIG. 3 and FIG. 4 is transmitted to the main shaft 102 of the shift drum transmission 100 through the clutch mechanism 163. Since the main shaft 102 is coupled with the countershaft 103 by a pair of change gears which are engaged with each other and selected from change gear groups 104, the countershaft 103 turns at a revolution corresponding to the gear ratio of the speed change gears. The rear wheel 7 is turned by the drive sprocket 27 installed on the left side of the countershaft 103 through the drive chain 28 (see FIG. 1).

To change the speed, the driver steps on the shift lever 148 shown in FIG. 2. When the shift lever 148 is depressed with the pin 130 as a fulcrum, the rod 147 is pulled substantially downward, and the link member 145 connected to the upper portion of the rod 147 by the pin 146 moves down with the change spindle 124 as the center. Since clockwise torque is applied to the change spindle 124, the engagement claw 123 of the shift arm 122 connected to the change spindle 124 turns clockwise with the change spindle 124 as the center (direction shown by an arrow E in FIG. 2). Thereby, the drum pin 121 engaged with the engagement claw 123 shown in FIG. 6 is pushed down by a predetermined amount and the shift plate 117 turns. Therefore, the shift drum 105 fixed to the shift plate 117 turns at an angle equal to the revolution angle of the shift plate 117.

At this point, the stopper plate 152 fixed to the shift drum 105 also turns. The stopper plate 152 pushes back the stopper roller 157 of the stopper roller assembly 156 in elastic contact with the stopper plate 152. The stopper roller 157 is pushed back along the outer wall of the stopper plate 152 and fitted into the groove 155 after revolution by the urging force of the return spring 160 when the stopper plate 152 turns at a revolution angle corresponding to one groove 155. Thereby, the stopper plate 152 and the shift drum 105 fixed to the stopper plate 152 stop turning.

When the driver releases his foot from the shift lever 148, the shift lever 148 moves up. The shift arm 122 is returned in a direction opposite to the direction shown by the arrow E in FIG. 2 until the stopper pin 126 and the slit 127 are brought into contact with each other by the shift return spring 125 and then the shift arm 122 engages with the next drum pin 121.

Since the cam face 201 also turns at this point, a current is output from the sensor 202. In other words, since the projection portion 201a of the cam face 201 presses the detection pin 203 before the revolution of the shift drum 105, the detection pin 203 shown in FIG. 7 comes into contact with the contact member 211, and electricity runs through the cam face 201 and the contact member 211 to output a current from the terminal 213.

When the shift drum 105 turns through cooperation between the shift arm 122 and the drum pin 121 by the operation of the shift lever 148, the projection portion 201a is disengaged from the detection pin 203. Thereby, the detection pin 203 is pushed back by the spring 207, the cam face 201 is insulated from the contact member 211, and the output of a current from the terminal 213 is stopped.

Further, when the shift drum 105 is stopped at a revolution angle corresponding to a predetermined speed by cooperation between the stopper plate 152 and the stopper roller assembly 156, the projection portion 201a corresponding to the speed presses the detection pin 203 again and a current is output from the terminal 213.

Since the cam face 201 has the projection portions 201a corresponding to all the speeds including "neutral", the speed which is changed from time to time can be detected by monitoring a current output from the sensor 202. As for the length of the hollow portion of the sensor 202 and the length of the detection pin 203, when the detection pin 203 is pressed by the projection portion 203a, the detection pin 203 comes into contact with the contact member 211 and when the detection pin 203 is not pressed, they are separate from each other.

When the shift drum 105 shown in FIG. 6 turns, the engagement positions between the grooves 109 formed on the outer wall of the shift drum 105 and the shift forks 110, 111 and 112 change. The grooves 109 corresponding to the speed before revolution move the shift forks 10, 111 and 112 engaged therewith in the axial direction of the shift drum 105. Since the shift forks 110, 111 and 112 are movably supported to the shift fork shafts 113 and 114, when one ends of the shift forks 110, 111 and 112 are moved, the other end fork portions move in the same direction. The shift forks 110, 111 and 112, engaged with the grooves 109 corresponding to the speed before revolution, move along the shift fork shafts 113 and 114, and move the corresponding change gears 104 in the axial direction of the shafts 102 and 103 and disengage them from the other change gears of the shafts 102 and 103. The shift forks 110, 111 and 112, engaged with the grooves 109 corresponding to the speed after revolution, move along the shift fork shafts 113 and 114, and move the corresponding change gears in the axial direction of the shafts 102 and 103, and engage them with the predetermined change gears of the other shafts 102 and 103.

A description is subsequently given of the procedure of attaching and detaching the shift drum transmission 100 to and from the crankcase 31.

To detach the shift drum transmission 100 from the powertrain assembly 15, the drive sprocket cover 165 on the left side of the powertrain assembly 15 and the crankcase cover on the right side of the powertrain assembly 15 are first removed. When the drive sprocket cover 165 is removed, the left end portion 103a of the countershaft 103 appears, and then the drive sprocket 27 (see FIG. 14) fixed to the countershaft 103 is removed. When the crankcase cover on the right side is removed, the clutch mechanism 163 appears and therefore is removed to expose the transmission cover plate 101 and the chain 129 for driving an oil pump. Then, the chain 129 is removed to disconnect the oil pump 89 from the shift drum transmission 100.

Then, the bolt on the outer wall of the transmission cover plate 101 is removed to pull out the transmission cover plate 101 in the direction shown by the arrow D in FIG. 5 in order to remove the shift drum transmission 100 from the crankcase 31. At this point, the main shaft 102 journaled by the transmission cover plate 101, the countershaft 103 and the shift drum 105 are pulled out from the crankcase 31. Since the oil pump 89 is arranged not to overlap with the transmission attachment face 95 in the side view of the powertrain assembly 15, even when the shift drum transmission 100 is pulled out straight in the axial direction of the main shaft 102 (that is, the direction shown by the arrow D in FIG. 5), the shift drum transmission 100 does not interfere with the oil pump 89. Therefore, the shift drum transmission 100 can be pulled out smoothly.

Since the stopper plate 152 and the stopper roller assembly 156 are arranged on the transmission cover plate 101 side, they are pulled out together with the transmission cover plate 101. Similarly, the shift plate 117 having the drum pins 121 fitted therein is pulled out from the crankcase 31 together with the shift drum 105. Meanwhile, the shift arm 122 which has been engaged with the drum pin 121 remains on the crankcase 31 side (see FIG. 6).

To set the shift drum transmission 100 in the powertrain assembly 15, as shown in FIG. 4 and FIG. 5, the transmission cover plate 101 is inserted into the transmission case 92 of the crankcase 31. At this point, the shift plate 117 extends through the left wall 93 of the transmission case 92 and the drum pin 121 is engaged with the engagement claw 123. Since the shift drum transmission 100 and the oil pump 89 do not interfere with each other when the shift drum transmission 100 is inserted into the transmission case 92, the shift drum transmission 100 can be inserted into the transmission case 92 very smoothly. The transmission cover plate 101 is fixed on the transmission attachment face 95 of the crankcase 31 by a bolt in this state, the chain 129 is put on the oil pump drive sprocket 129 and the oil pump driven sprocket 84, and the clutch mechanism 163 is mounted to the right end portion 102b (see FIG. 5) of the main shaft 102 projecting in a right direction from the transmission cover plate 101. Since the countershaft 103 projects on the left side of the powertrain assembly 15, the drive sprocket 27 is fixed to the countershaft 103. Thereafter, the drive sprocket cover 165 is put on the left side of the crankcase 31, and the crankcase cover is put on the right side of the crankcase 31.

As described above, since the oil pump 89 and the transmission attachment face 95 of the crankcase 31 are arranged not to overlap with each other, when viewed from the side of the engine, in the powertrain assembly 15 of this embodiment, even when the shift drum transmission 100 is moved straight in the axial direction of the main shaft 102 to be attached to or detached from the crankcase 31, the shift drum transmission 100 and the oil pump 89 do not interfere with each other, and the attachment and detachment of the shift drum transmission 100 is easy, thereby improving serviceability.

In addition, since the oil pump 89 is arranged not to overlap with the clutch outer 191 and the primary driven gear 190 of the clutch mechanism 163 when viewed from the side of the engine in this embodiment, the transmission cover plate 101 of the shift drum transmission 100 and the primary driven gear 190 of the clutch mechanism 163 can be brought very close to each other, thereby making it possible to reduce the width of the powertrain assembly 15. As a result, the large number of possible mounting positions of the engine within the vehicle can be ensured.

Since the oil pump 89 is driven by the main shaft 102 of the shift drum transmission 100 through the chain 129, when the shift drum transmission 100 is to be removed from the crankcase 31, the oil pump 89 can be disconnected from the shift drum transmission 100 by removing the chain 129. Therefore, the shift drum transmission 100 can be attached or detached very easily, thereby improving serviceability.

The water pump 55 and the oil pump 89 are positioned substantially so as to be coaxial with each other, the water pump 55 is installed below the drive sprocket 27, and the chain line on the drive sprocket 27 side of the drive chain 28 and the water pump 55 overlap each other when viewed from the side of the engine while substantial interference between them is eliminated. Therefore, the water pump 55 can be arranged very close to the countershaft 103.

The present invention is not limited to the above embodiment. For instance, the vehicle to be equipped with the engine is not limited to a two-wheeled vehicle and may be a movable body such as a three-wheeled vehicle, four-wheeled vehicle or boat.

Although an embodiment of the present invention is explained in detail above, the described embodiment of the present invention may be modified in a variety of ways without departing from the spirit and scope of the present invention, as set forth in the appended claims. All such modifications, which fall within the scope of the claims, are intended to be encompassed by the present invention.

We claim:

1. A powertrain assembly comprising an engine and a transmission, said engine comprising:
   a crankcase with a crankshaft rotatably supported therein;
   an oil pan installed below the crankcase;
   and an oil pump for circulating a lubricating oil from the oil pan through the engine;
   wherein said transmission is provided for receiving rotary torque, rotating at an engine speed from said crankshaft at a main transmission shaft, changing it to modified rotary torque rotating at a different speed, and delivering the modified rotary torque outwardly via a transmission countershaft;
   wherein the transmission comprises a modular cartridge transmission which is attachable to and detachable from a transmission attachment face comprising a side face of the crankcase with a major part of the transmission fitting inside of the crankcase;
   and further wherein the oil pump and the transmission attachment face are arranged in substantially non-overlapping relation when viewed from the side of the engine.

2. The powertrain assembly according to claim 1, further comprising a clutch mechanism having a primary driven gear interposed between the crankshaft, the transmission and the oil pump, and wherein the primary driven gear, the crankshaft, the transmission and the oil pump are arranged in substantially non-overlapping relation when viewed from the side of the engine.

3. The powertrain assembly according to claim 1, wherein the oil pump is driven by a pump chain extending between it and the main transmission shaft.

4. The powertrain assembly according to claim 1, wherein the engine comprises a water pump for supplying coolant to selected parts of the engine, wherein
   a water pump shaft of the water pump and an oil pump shaft of the oil pump are arranged to be coaxial to each other when viewed from the side of the engine, and
   the water pump is arranged to overlap with a chain line on the drive sprocket side of a drive chain put on a drive sprocket fitted onto the countershaft when viewed from the side of the engine.

5. The powertrain assembly according to claim 1, wherein the oil pump is driven by a pump chain extending between the oil pump and the main transmission shaft.

6. The powertrain assembly according to claim 5 wherein the engine comprises a water pump for supplying coolant to selected parts of the engine, wherein
   a water pump shaft of the water pump and an oil pump shaft of the oil pump are arranged to be coaxial to each other when viewed from the side of the engine, and
   the water pump is arranged to overlap with a chain line on the drive sprocket side of a drive chain put on a drive sprocket fitted onto the countershaft when viewed from the side of the engine.

7. The powertrain assembly according to claim 6, wherein the transmission comprises a shift drum transmission, and wherein the shift drum transmission comprises a shift drum and a sensor for sensing the position of the shift drum.

8. The powertrain assembly according to claim 7, wherein the sensor comprises a sensor body and a pin, wherein the pin has a proximal end disposed within the sensor body, wherein the pin has a distal end disposed outside the sensor body, and wherein a spring is provided within the sensor body that urges the distal end of the pin against an exterior surface of the shift drum.

9. The powertrain assembly according to claim 7, wherein the shift drum comprises a shaped exterior surface, wherein the distal end of the pin contacts the shaped exterior surface, and wherein shapes provided on the shaped exterior surface correspond to transmission gear positions so that the sensor senses the current gear position via the pin.

10. A powertrain assembly comprising an engine with a crankshaft disposed within a crank case, the powertrain assembly further comprising a cartridge transmission wherein the cartridge transmission comprises a transmission housed within a cartridge, the cartridge selectively detachable from, and attachable to, the crankcase, wherein
    the cartridge transmission fits within the engine such that when the cartridge is attached and detached from the engine, there is substantially no interference between the cartridge transmission and other engine components.

11. The powertrain assembly of claim 10, wherein the engine comprises an oil pump, and wherein the oil pump and the cartridge are arranged not to overlap with each other when viewed from the side of the engine.

12. The powertrain assembly according to claim 10, further comprising a primary driven gear of a clutch mechanism interposed between the crankshaft, the transmission and the oil pump, and wherein the primary driven gear, the crankshaft, the transmission and the oil pump are arranged not to overlap with each other when viewed from the side of the engine.

13. The powertrain assembly according to claim 10, wherein the engine comprises a water pump for supplying coolant to selected parts of the engine, wherein
    a water pump shaft of the water pump and an oil pump shaft of the oil pump are arranged to be substantially coaxial to each other when viewed from the side of the engine, and
    wherein the water pump is arranged to overlap with a chain line on the drive sprocket side of a drive chain put on a drive sprocket fitted onto the countershaft when viewed from the side of the engine.

14. The powertrain assembly according to claim 10, wherein the transmission comprises a shift drum transmission, and wherein the shift drum transmission comprises a shift drum and a sensor for sensing the position of the shift drum.

15. The powertrain assembly according to claim 14, wherein the sensor comprises a sensor body and a pin, wherein the pin has a proximal end disposed within the sensor body, wherein the pin has a distal end disposed outside the sensor body, and wherein a spring is provided within the sensor body that urges the distal end of the pin against an exterior surface of the shift drum.

16. The powertrain assembly according to claim 15 wherein a shaped portion of the exterior surface of the shift drum is provided with plural cams arranged circumferentially about the exterior surface, wherein the distal end of the pin is adapted to contact the shaped portion, and wherein each cam of the plural cams corresponds to a transmission gear position so that the sensor senses the current gear position via the position of the pin.

17. A powertrain assembly comprising an engine and a transmission, said engine comprising:
    a crankcase with a crankshaft rotatably supported therein;
    an oil pan installed below the crankcase;

and an oil pump for circulating a lubricating oil from the oil pan through the engine;

wherein said transmission is provided for receiving rotary torque, rotating at an engine speed from said crankshaft at a main transmission shaft, changing it to modified rotary torque rotating at a different speed, and delivering the modified rotary torque outwardly via a transmission countershaft; wherein the transmission comprises a transmission body housed within a cartridge such that the cartridge is selectively detachable from the crankcase, and the engine is configured such that the crankshaft, the main shaft, and the countershaft each define a respective axis, wherein the axes of the crankshaft and the countershaft cooperate to define a plane, and wherein the axis of the main shaft is positioned above the plane defined by the axes of the crankshaft and the countershaft.

18. The powertrain assembly of claim 17, wherein the transmission cartridge is adapted to be selectively detachably secured to the crankcase at a transmission attachment face, and wherein the oil pump is positioned within the engine such that it lies below the transmission attachment face, so that when the transmission is inserted into or removed from the engine, there is substantially no interference between the transmission and the oil pump.

19. The powertrain assembly according to claim 17, wherein the engine comprises a water pump for supplying coolant to selected portions of the engine, wherein a water pump shaft of the water pump and an oil pump shaft of the oil pump are arranged to be coaxial to each other when viewed from the side of the engine, the water pump shaft is linked to and driven by the oil pump shaft, the oil pump shaft is driven by a pump chain extending from the main transmission shaft, and the water pump is arranged to overlap with a chain line on the drive sprocket side of a drive chain put on a drive sprocket fitted onto the countershaft when viewed from the side of the engine.

* * * * *